(12) United States Patent
Aikoh et al.

(10) Patent No.: US 7,882,513 B2
(45) Date of Patent: Feb. 1, 2011

(54) OPTICAL DISC DEVICE AND METHOD FOR CONTROLLING OPTICAL DISC DEVICE

(75) Inventors: Hideki Aikoh, Osaka (JP); Makoto Takashima, Nara (JP); Takao Hayashi, Osaka (JP); Akira Yoshikawa, Nara (JP); Tomio Yamamoto, Hyogo (JP); Kouretsu Boku, Kyoto (JP)

(73) Assignee: Panasonic Corporation, Osaka (JP)

( * ) Notice: Subject to any disclaimer, the term of this patent is extended or adjusted under 35 U.S.C. 154(b) by 649 days.

(21) Appl. No.: 11/909,379

(22) PCT Filed: Mar. 20, 2006

(86) PCT No.: PCT/JP2006/305613
§ 371 (c)(1),
(2), (4) Date: Oct. 10, 2007

(87) PCT Pub. No.: WO2006/101099
PCT Pub. Date: Sep. 28, 2006

(65) Prior Publication Data
US 2009/0016196 A1 Jan. 15, 2009

(30) Foreign Application Priority Data
Mar. 22, 2005 (JP) ............................. 2005-080935
May 11, 2005 (JP) ............................. 2005-138029

(51) Int. Cl.
*G11B 17/00* (2006.01)
(52) U.S. Cl. .................. 720/671; 369/44.16; 369/244.1
(58) Field of Classification Search ............. 369/44.16, 369/244.1; 720/671
See application file for complete search history.

(56) References Cited

U.S. PATENT DOCUMENTS 5,294,872 A * 3/1994 Koharagi et al. ....... 318/400.15

(Continued)

FOREIGN PATENT DOCUMENTS

CN 1335615 A 2/2002

(Continued)

OTHER PUBLICATIONS

Office Action for Chinese Application No. 200680009301.4 dated Feb. 6, 2009.

(Continued)

*Primary Examiner*—Wayne R Young
*Assistant Examiner*—Brenda Bernardi
(74) *Attorney, Agent, or Firm*—RatnerPrestia

(57) ABSTRACT

An optical disk device of the present application includes: a turntable 30 including plural induction grooves 31*a* to 31*h* as concave portions radially extending from vicinity of a center of the turntable 30 and having open portions in an outer periphery of the turntable 30 and plural through-holes 32*a* to 32*h* penetrating bottom faces 33*a* to 33*h* on the vicinity of the center side of the plural induction grooves 31*a* to 31*h* and a top face of the turntable 30; and an outer rotor type spindle motor 35 provided with plural fins 36*a* to 36*h* as convex portions on a rotor on a side face thereof. The optical disk device of the present application utilizes an airflow generated by rotation of the rotor of the spindle motor 35 and the turntable 30 in conjunction therewith as a dust removing wind for removing dust attaching to an objective lens side area.

32 Claims, 22 Drawing Sheets

U.S. PATENT DOCUMENTS

| | | | |
|---|---|---|---|
| 6,657,944 B2 * | 12/2003 | Mohri et al. | 720/681 |
| 7,271,511 B2 * | 9/2007 | Osaka | 310/12.27 |
| 2001/0046104 A1 | 11/2001 | Inoue et al. | |
| 2005/0128897 A1 * | 6/2005 | Yamasaki et al. | 369/44.27 |

FOREIGN PATENT DOCUMENTS

| | | | | |
|---|---|---|---|---|
| JP | 3-127395 | A | | 5/1991 |
| JP | 03127395 | A | * | 5/1991 |
| JP | 4-126398 | U | | 11/1992 |
| JP | 6-282933 | A | | 10/1994 |
| JP | 06282933 | A | * | 10/1994 |
| JP | 8-339623 | A | | 12/1996 |
| JP | 08339623 | A | * | 12/1996 |
| JP | 2001-319355 | A | | 11/2001 |
| JP | 2003-272171 | A | | 9/2003 |
| JP | 2003-346372 | A | | 12/2003 |
| JP | 2003346372 | | * | 12/2003 |
| JP | 2004-164733 | A | | 6/2004 |

OTHER PUBLICATIONS

International Search Report for PCT/JP2006/305613, dated Apr. 18, 2006.

* cited by examiner (a)

(d)

(b)

(c)

(a)

(b)

(c)

(a)

(b)

(c)

(a)

(b)

(a)

(b)

(c)

(a)

(b)

OPTICAL DISC DEVICE AND METHOD FOR CONTROLLING OPTICAL DISC DEVICE

This application is a U.S. national phase application of PCT International Patent Application No. PCT/JP2006/305613 filed Mar. 20, 2006, claiming the benefit of priority of Japanese Patent Application Nos. 2005-080935 filed Mar. 22, 2005, and 2005-138029 filed May 11, 2005, all of which are incorporated by reference herein in their entirety.

TECHNICAL FIELD

The present invention relates to an optical disk device and a method of controlling an optical disk device.

BACKGROUND ART

A digital versatile disk (hereinafter, referred to as a DVD) is capable of recording digital data at recording density approximately six times that of a compact disk (hereinafter, referred to as a CD), and is known as a ROM or a recordable optical disk having large-volume data such as images formed therein.

In recent years, an optical disk of high recording density having a capacity still larger than the DVD is in demand as a ROM because of improved image quality and the like and also because of an increase in an amount of information to be recorded.

To render recording density of an optical disk higher, it is only necessary, in general, to reduce a spot diameter of a laser beam radiated on the optical disk when recording and reproducing data.

To reduce the spot diameter of a laser beam, it is only necessary to reduce a wavelength of the laser beam and increase numeric apertures (NA) of an objective lens for forming a light spot on the optical disk. In the case of the DVD for instance, it uses a semiconductor laser beam of which wavelength is 660 nm and a light condensing element (objective lens) of NA 0.6. In the case of using a blue laser of which wavelength is 405 nm and an objective lens of NA 0.85 for the sake of rendering the recording density of the optical disk higher, it is possible to obtain a ROM and a recordable optical disk of recording density approximately five times that of the DVD (hereinafter, referred to as a high-density optical disk).

If the NA is increased without changing an outside diameter size of the objective lens so much, a working distance (WD) between the objective lens and the optical disk becomes shorter. To be more precise, in the case of using the blue laser of 405-nm wavelength and the objective lens of NA 0.85, the WD becomes 0.3 mm or so. As wobbling of the optical disk (DVD) is 0.3 mm or so, an optical disk device for recording and reproducing the high-density optical disk is apt to have a clash between the objective lens and the optical disk when a focus servo comes off, when a vibration is exerted while stopping operation, and the like. If an impact scar or a flaw is generated on the objective lens or the optical disk due to the clash, there arises a problem that information recorded on the optical disk cannot be correctly reproduced or information cannot be correctly recorded on the optical disk.

A generally used conventional technique will be described as an instrument which solves the above problem.

FIG. 17 is a top view of a conventional optical disk device included in Japanese Patent Laid-Open No. 2001-319355. FIG. 18 is an X to X sectional view of FIG. 17.

An optical disk device 90 shown in FIGS. 17 and 18 includes an optical head 11, a signal processing circuit 120, a servo control circuit 130, a traverse motor 15, a turntable 16 and a spindle motor 17. For convenience in description, FIG. 17 shows an optical disk 14. The optical head 11 radiates light beams collected on the optical disk 14 and detects reflected light from the optical disk 14 so as to output an electrical signal (light volume signal) according to a detected position and a detected light volume of the reflected light. The signal processing circuit 120 generates and outputs a focus error (FE) signal for indicating a focusing state of a light spot on the optical disk 14, a tracking error (TE) signal for indicating a positional relation between the light spot and tracks of the optical disk 14 and the like according to the light volume signal outputted by the optical head 11. The FE signal and TE signal are generically named servo signals. The servo control circuit 130 generates a driving signal according to the servo signal outputted by the signal processing circuit 120. The driving signal is a signal to be inputted to an actuator coil 117 described later for adjusting a position of an objective lens 115. The light spot on the optical disk 14 is controlled by the driving signal so as not to deviate from a recording layer of the optical disk 14. The spindle motor 17 rotates the optical disk 14 mounted on the turntable 16 at a rotational speed according to recording/reproduction speed. The traverse motor 15 moves the optical head 11 to a desired recording/reproduction position in a radial direction of the optical disk 14.

The optical head 11 includes a semiconductor laser 111, a beam splitter 112, a collimated lens 113, a mirror 114, the objective lens 115, the actuator coil 117, a multi-lens 118, a photodiode 119, an actuator cover 18, an objective lens holder 19 and protection members 13a to 13c. In the optical head 11, the semiconductor laser 111 is a semiconductor laser of a GaN system for performing blue emission, and is a semiconductor laser for radiating blue light beams.

The beam splitter 112 reflects the light beam emitted from the semiconductor laser 111. The collimated lens 113 is a lens for rendering the light beams reflected off the beam splitter 112 as parallel light. The objective lens 115 is a lens for collecting the light beams reflected off the mirror 114 and forming a light spot on the optical disk 14.

The actuator coil 117 moves the objective lens holder 19 having the objective lens 115 attached thereto in a vertical direction or a parallel direction to the optical disk 14 according to a level of an applied driving signal.

The light beams collected on the optical disk 14 transmit through the objective lens 115, mirror 114, collimated lens 113 and beam splitter 112. The multi-lens 118 collects the light beams having transmitted through the beam splitter 112 on the photodiode 119. The photodiode 119 converts incident light beams into the light volume signals.

The photodiode 119 generally has plural light receiving areas. For this reason, the signal processing circuit 120 generates the FE signal and TE signal by utilizing information on the light receiving areas of the photodiode 119 where the light volume signals were detected.

The signal processing circuit 120 reproduces an information signal written to the optical disk 14 based on the light volume signals in a state where the optical head 11 is controlled to form the light spot on the recording layer of the optical disk 14. The optical disk device 90 can record data in the recording layer of the optical disk 14 by rendering optical power of the light beams greater than that on reproduction.

In the case of the conventional optical disk device 90, the optical head 11 is provided with the protection members 13a to 13c projecting further on the optical disk 14 side than an apex of the objective lens 115 installed by surrounding the objective lens 115 in proximity to the objective lens 115 on the objective lens holder 19. The protection members 13a to 13c use an elastomeric resin (a silicon resin or a POM (polyoxymethylene resin) for instance) or the like as a material that hardly scratches the optical disk 14 even when contacting the optical disk 14.

Therefore, when a focus servo of the optical head 11 comes off, or when a vibration is exerted on the optical disk device 90 while stopping operation, and the like, the protection members 13a to 13c contact the optical disk 14 so that a direct clash between the objective lens 115 and the optical disk 14 can be prevented. To be more specific, the protection members 13a to 13c can prevent flaws from being generated on the objective lens 115 and the optical disk 14.

As for the conventional optical disk device 90, however, there is a possibility that dirt or dust may attach to surfaces of the protection members 13a to 13c or a data recording surface of the optical disk 14. There is a problem that a flaw is generated on the data recording surface of the optical disk 14 if a clash occurs in such a state between the protection members 13a to 13c and the optical disk 14 when the focus servo of the optical head 11 comes off or when a vibration is exerted on the optical disk device 90 while stopping operation. If a flaw is generated on the data recording surface of the optical disk 14, there arises a problem that the optical disk device 90 cannot correctly record data on the optical disk 14 or reproduce data recorded on the optical disk 14.

DISCLOSURE OF THE INVENTION

Therefore, in view of the above conventional problem, an object of the present invention is to provide an optical disk device, a method of controlling an optical disk device and an optical disk cartridge which reduce a possibility that a flaw may be generated on the data recording surface of the optical disk by a clash occurring between the protection members and the optical disk when the focus servo of the optical disk device comes off or when a vibration is exerted on the optical disk device while stopping operation.

The $1^{st}$ aspect of the present invention is an optical disk device comprising:

an optical head including an objective lens for recording data on an optical disk and/or reproducing the data recorded on the optical disk;

a turntable for mounting the optical disk;

a driving motor for rotating the turntable; and protection member provided on the optical head to prevent a clash between the objective lens and the optical disk, wherein a first airflow guide portion is provided on the optical head for guiding an airflow generated by rotation of the optical disk to the protection member.

The $2^{nd}$ aspect of the present invention is the optical disk device according to the $1^{st}$ aspect of the present invention, wherein:

the protection member is provided around the objective lens; and the first airflow guide portion is two grooves which are formed on a surface of an actuator cover opposed to the optical disk so as to be oriented toward one side and the other side from the objective lens in a circumferential direction of the optical disk and each of the two grooves has an open portion on a side of the actuator cover.

The $3^{rd}$ aspect of the present invention is the optical disk device according to the $1^{st}$ aspect of the present invention, wherein:

the protection member is provided around the objective lens; and the first airflow guide portion is two grooves which are formed on a surface of an objective lens holder opposed to the optical disk so as to be oriented toward one side and the other side from the objective lens in a circumferential direction of the optical disk and each of the grooves has an open portion on a side of the objective lens holder.

The $4^{th}$ aspect of the present invention is the optical disk device according to the $2^{nd}$ aspect of the present invention, wherein convex portions for changing the airflow are provided on bottom faces of the two grooves.

The $5^{th}$ aspect of the present invention is the optical disk device according to the $2^{nd}$ aspect of the present invention, wherein widths of the two grooves become narrower as the two grooves come closer to the objective lens.

The $6^{th}$ aspect of the present invention is the optical disk device according to the $2^{nd}$ aspect of the present invention, wherein depths of the two grooves become smaller as the two grooves come closer to the objective lens.

The $7^{th}$ aspect of the present invention is the optical disk device according to the $1^{st}$ aspect of the present invention, further comprising a second airflow guide portion for sending wind to the optical head.

The $8^{th}$ aspect of the present invention is the optical disk device according to the $7^{th}$ aspect of the present invention, wherein:

the second airflow guide portion is a airflow guide plate including (i) a bottom on a surface opposed to the optical disk and (ii) a sidewall formed along a circumferential direction of the optical disk from the bottom and extended to the optical disk side, and placed on a circumferential direction side of the actuator cover or the objective lens holder.

The $9^{th}$ aspect of the present invention is the optical disk device according to the $8^{th}$ aspect of the present invention, wherein a width between an inner circumferential side and an outer circumferential side of the airflow guide plate becomes smaller as the airflow guide plate comes closer to the optical head.

The $10^{th}$ aspect of the present invention is the optical disk device according to the $8^{th}$ aspect of the present invention, wherein the airflow guide plate is inclined toward the optical disk at an angle at which a distance between the airflow guide plate and the optical disk becomes smaller as the airflow guide plate comes closer to the optical head side.

The $11^{th}$ aspect of the present invention is a disk cartridge for housing an optical disk onto which information is recorded by an optical disk device having a turntable and an optical head having an actuator cover, the disk cartridge comprising:

a downside body; and an upside body including:

(i) an opening for letting the actuator cover of the optical head and the turntable into the upside body; and (ii) two grooves, on a surface of the upside body opposed to the optical disk toward a circumferential direction from a margin of the opening, for guiding an airflow generated by rotation of the optical disk.

The $12^{th}$ aspect of the present invention is the disk cartridge according to the $11^{th}$ aspect of the present invention, wherein widths of the two grooves become gradually narrower as the two grooves come closer to the margin of the opening.

The $13^{th}$ aspect of the present invention is the disk cartridge according to the $11^{th}$ aspect of the present invention, wherein a taper portion is provided for rendering depths of the two grooves gradually shallower as the two grooves come closer to the margin of the opening.

The $14^{th}$ aspect of the present invention is the optical disk device according to the $7^{th}$ aspect of the present invention, wherein the second airflow guide portion comprises a first concave portion and/or a first convex portion provided on a surface of the rotor of the driving motor for the sake of generating an airflow to the protection member.

The 15th aspect of the present invention is the optical disk device according to the 14th aspect of the present invention, wherein:

the driving motor is an outer rotor type motor; and the concave portions are plural grooves provided on an outer circumferential surface of the rotor of the driving motor at a predetermined angle to the turntable.

The 16th aspect of the present invention is the optical disk device according to the 14th aspect of the present invention, wherein:

the driving motor is an outer rotor type motor; and the convex portions are plate-like projections provided on the outer circumferential surface of the rotor of the driving motor.

The 17th aspect of the present invention is the optical disk device according to the 14th aspect of the present invention, wherein the second airflow guide portion comprises a second concave portion and/or a second convex portion provided on a surface of the turntable for generating an airflow to the protection member, other than the first concave portion and/or the first convex portion.

The 18th aspect of the present invention is the optical disk device according to the 17th aspect of the present invention, wherein the second concave portions are plural grooves which are formed radially or as if drawing an arc from vicinity of a center of the turntable and include open portions on outer peripheries of the turntable.

The 19th aspect of the present invention is the optical disk device according to the 17th aspect of the present invention, wherein the plural grooves are provided on an opposite side of a surface on which the turntable contacts the optical disk.

The 20th aspect of the present invention is the optical disk device according to the 17th aspect of the present invention, wherein:

the plural grooves are provided on a surface on which the turntable contacts the optical disk; and the turntable is provided with plural holes penetrating a bottom face of the vicinity of the center side of the plural grooves and an opposite-side surface of the surface of the turntable contacting the optical disk.

The 21st aspect of the present invention is the optical disk device according to the 17th aspect of the present invention, wherein the second convex portions are plate-like projections provided on the outer peripheries of the turntable.

The 22nd aspect of the present invention is the optical disk device according to the 14th aspect of the present invention, wherein:

the second airflow guide portion further comprises an induction plate for inducing the airflow which surrounds an outer circumference of at least one of the turntable and the rotor of the driving motor and includes an opening in a direction of the protection member.

The 23rd aspect of the present invention is the optical disk device according to the 1st aspect of the present invention, further comprising:

a stopper for preventing a predetermined limit value from being exceeded in movement of the optical head to a center side in the radial direction of the optical disk.

The 24th aspect of the present invention is a method of controlling an optical disk device having a driving motor for rotating a turntable for mounting an optical disk comprising the steps of controlling generation of an airflow by rotation of the optical disk and guiding the airflow to protection member provided on an optical head of the optical disk device to prevent a clash between an objective lens and the optical disk;

driving the driving motor for a predetermined period in predetermined timing according to whether or not the optical disk is mounted on the turntable.

The 25th aspect of the present invention is the method of controlling an optical disk device according to the 24th aspect of the present invention, further comprising the steps of:

detecting timing of when the optical disk is mounted on the turntable; and driving the driving motor before the optical disk is mounted on the turntable based on a result of the detection.

The 26th aspect of the present invention is the method of controlling an optical disk device according to the 25th aspect of the present invention, further comprising the step of:

in the case where the driving motor is driven in a reverse direction before the optical disk is mounted on the turntable in the step of driving the driving motor, subsequently continuing to drive the driving motor in a positive direction.

The 27th aspect of the present invention is the method of controlling an optical disk device according to the 24th aspect of the present invention, further comprising the step of:

when driving the driving motor for a predetermined period in the predetermined timing, moving the optical head in an innermost circumferential position in a radial direction of the optical disk.

The 28th aspect of the present invention is the method of controlling an optical disk device according to the 24th aspect of the present invention, further comprising:

a step of switching a rotation direction of the driving motor for changing a direction of the airflow and/or a step of changing rotation speed of the driving motor for changing intensity of the airflow.

The 29th aspect of the present invention is the optical disk device according to the 3rd aspect of the present invention, wherein convex portions for changing the airflow are provided on bottom faces of the two grooves.

The 30th aspect of the present invention is the optical disk device according to the 3rd aspect of the present invention, wherein widths of the two grooves become narrower as the two grooves come closer to the objective lens.

The 31st aspect of the present invention is the optical disk device according to the 3rd aspect of the present invention, wherein depths of the two grooves become smaller as the two grooves come closer to the objective lens.

The 32nd aspect of the present invention is the optical disk device according to the 17th aspect of the present invention, wherein:

the second airflow guide portion further comprises an induction plate for inducing the airflow which surrounds an outer circumference of at least one of the turntable and the rotor of the driving motor and includes an opening in a direction of the protection member. Next, the 33rd to the 35th aspects of the present invention will be listed as inventions related to the present invention as mentioned above.

The 33rd aspect of the present invention is:

a disk cartridge including space for housing an optical disk between an upside body and a downside body, wherein:

the upside body includes:

(i) an opening for letting an actuator cover of the optical head and a turntable into the upside body; and (ii) two grooves for guiding an airflow generated by rotation of the optical disk, provided on a surface opposed to the optical disk toward a circumferential direction from a margin of the opening.

The 34th aspect of the present invention is:

the disk cartridge according to the 33rd aspect of the present invention, wherein:

widths of the two grooves become gradually narrower as the two grooves come closer to the margin of the opening.

The 35th aspect of the present invention is:

the disk cartridge according to the 33rd aspect of the present invention, wherein:

a taper portion is provided for rendering depths of the two grooves gradually shallower as the two grooves come closer to the margin of the opening.

BRIEF DESCRIPTION OF THE DRAWINGS

FIG. 7 (b) is a side view of the turntable 30 and spindle motor 35 of the optical disk device according to the fourth embodiment, and FIG. 7 (c) is an E to E sectional view of the turntable 30 and spindle motor 35 of the optical disk device according to the fourth embodiment;

Figure 1:
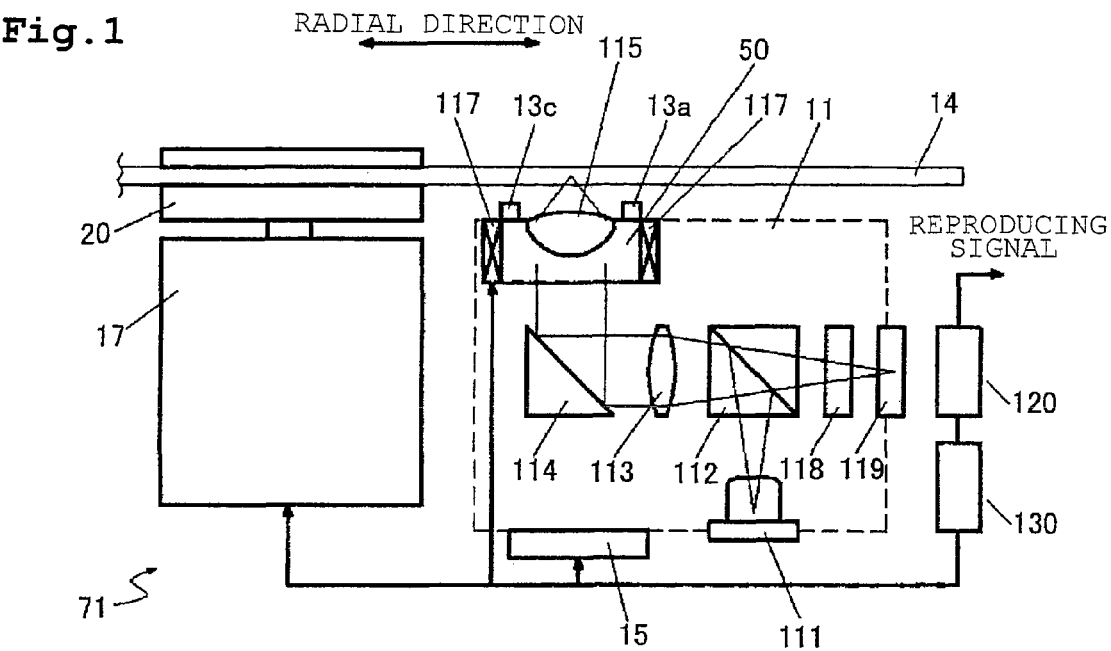
FIG. 1 is a block sectional view showing a configuration of an optical disk device 71 according to a first embodiment.

DESCRIPTION OF SYMBOLS 10, 71, 75, 78, 79, 80, 81, 82, 83 Optical disk devices
11 Optical head
13a to 13c Protection members
14 Optical disk
15 Traverse motor
16, 20, 25, 30 Turntables
17, 35 Spindle motors
18, 50, 55 Actuator covers
19, 60 Objective lens holders
22a to 22h, 26a to 26h, 31a to 31h Induction grooves
23a to 23h, 36a to 36h Fins
24a to 24h Open portions
32a to 32h Through-holes
33a to 33h Bottoms
24, 34 Outer peripheries
34a to 34h Open portions
40 Induction plate
41 Stopper
51a, 51b, 56a, 56b, 61a, 61b, 85, 86 Grooves
52, 52a, 52b, 58, 58a, 58b, 62, 62a, 62b, 68, 68a, 68b, 88, 88a, 88b, 89, 89a, 89b Airflows
53, 67, 85c, 86c Open portions
54a Groove width
54a Bottom face
57a to 57c Convex portions
65 Airflow guide plate
66a, 66b, 85a, 85b, 86a, 86b Sidewalls
84 Disk cartridge
84a Upside body
84b Downside body
85d, 86d Taper portions
87 Opening
111 Semiconductor laser
112 Beam splitter
113 Collimated lens
114 Mirror
115 Objective lens
117 Actuator coil
118 Multi-lens
119 Photodiode
120 Signal processing circuit
130 Servo control circuit
691 Chassis 692 Guide shaft
693 Stay
694 Lead screw

BEST MODE FOR CARRYING OUT THE INVENTION

Hereunder, embodiments of the present invention will be described by referring to the drawings.

First Embodiment

Figure 17:
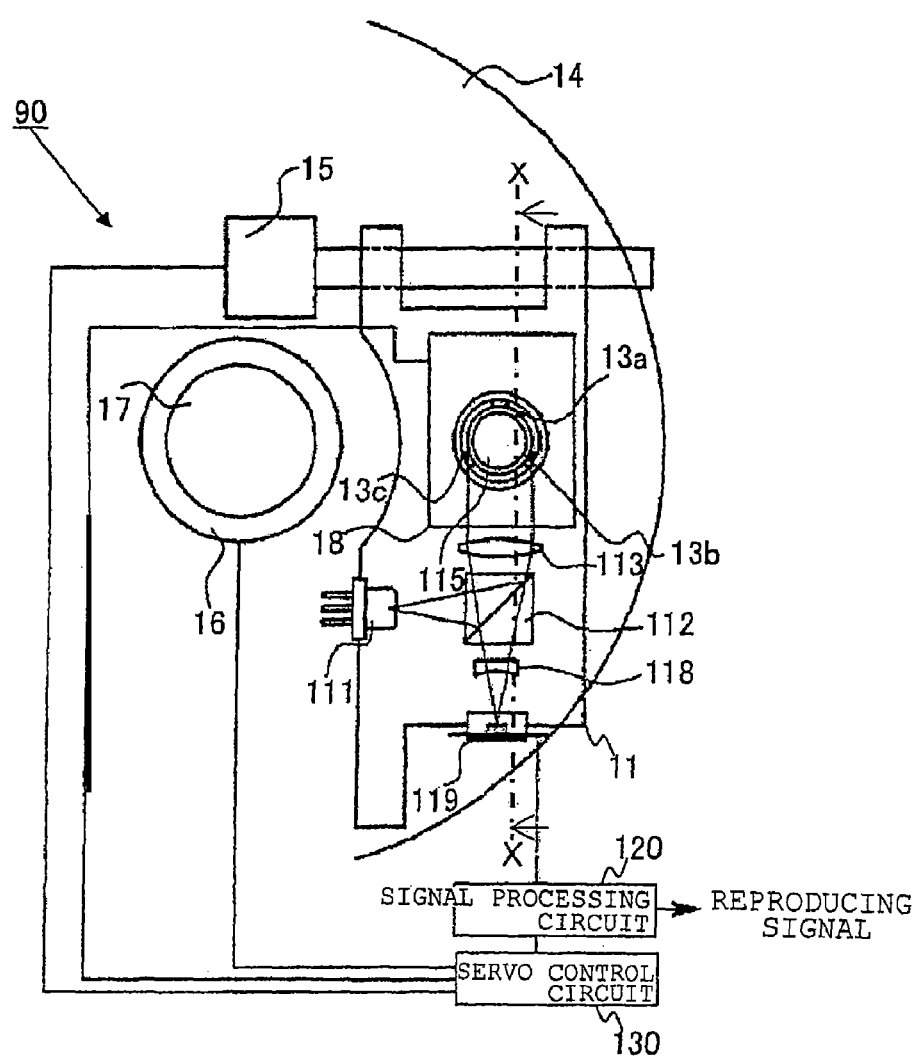
FIG. 17 is a top view of a conventional optical disk device.
Figure 18:
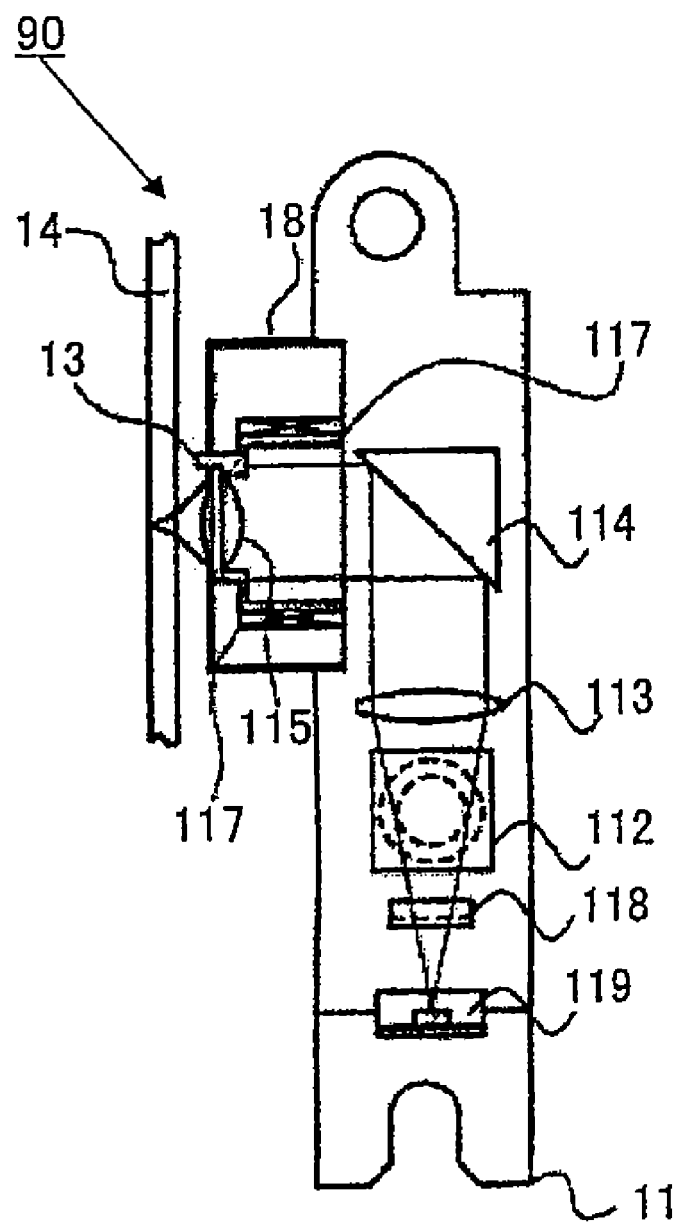
FIG. 18 is an X to X sectional view of the conventional optical disk device.

FIG. 1 is a simplified block diagram for functionally describing an optical disk device 71 in a configuration of the optical disk device 71 according to a first embodiment of the present invention. In the following description, the same reference marks as those for blocks constituting a conventional optical disk device 90 of FIGS. 17 and 18 are given to the blocks constituting the optical disk device 71 of FIG. 1 for performing the same operation as the blocks constituting the conventional optical disk device 90, and a description thereof will be omitted.

The optical disk device 71 according to this embodiment will be described in detail by using FIG. 2 and FIGS. 3 (a) to (d).

Figure 2:
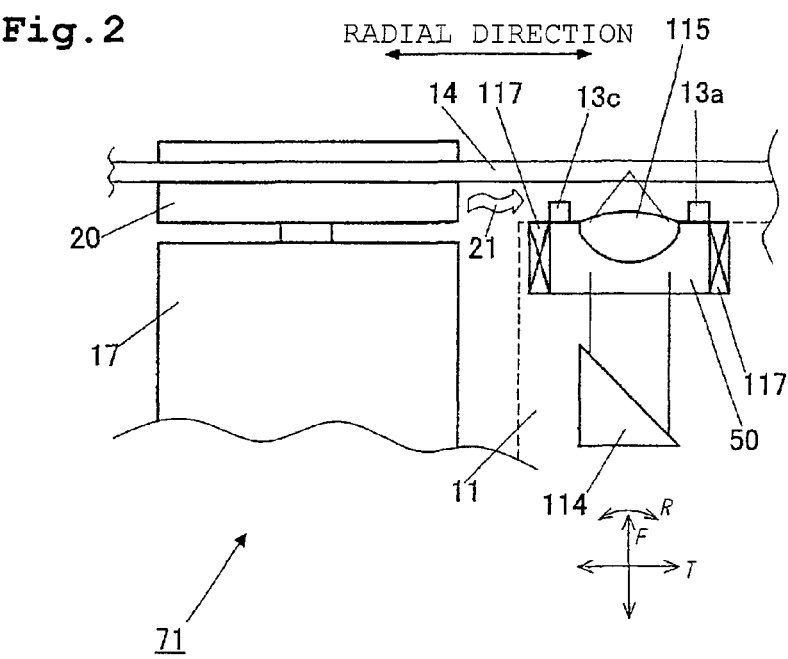
FIG. 2 is a diagram showing enlarged vicinity of a turntable 20 of the optical disk device 71.

FIG. 2 is a diagram showing enlarged vicinity of a turntable 20 and a spindle motor 17 of the optical disk device 71 shown in FIG. 1. As shown in FIG. 2, the turntable 20 fixed on the spindle motor 17 as a motor for driving the turntable 20 rotates with an optical disk 14 mounted thereon. An optical head 11 may be positioned on an innermost circumferential side in a radial direction of the optical disk 14. The position on the innermost circumferential side in the radial direction means a mechanical limit position movable to the inner circumferential side in an area where the optical head 11 can radially move.

An arrow 21 of FIG. 2 indicates a dust removing wind. The dust removing wind refers to an airflow for removing dust attaching to the area around an objective lens 115 including protection members 13a to 13c or a surface of the optical disk on the objective lens 115 side (hereinafter, referred to as an objective lens side area). Operation of the optical disk device 71 for generating the dust removing wind will be described later.

A detailed structure of the turntable 20 will be described by using FIGS. 3 (a) to 3 (d).

Figure 3:
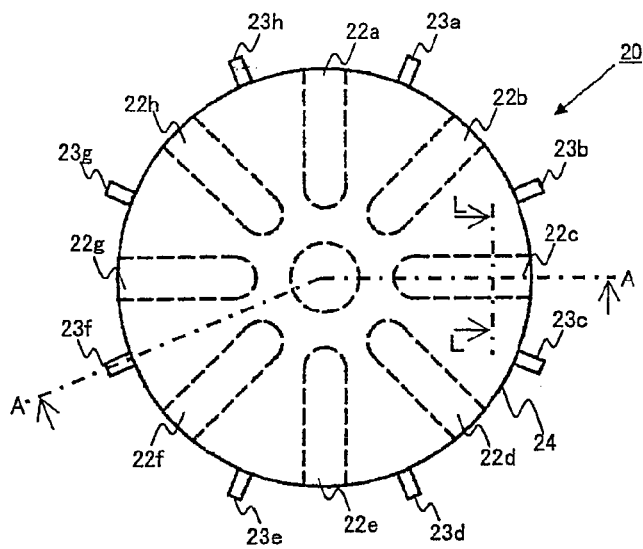
FIG. 3 (a) is a top view of the turntable 20 of the optical disk device 71 according to the first embodiment, FIG. 3 (b) is an A to A sectional view of the turntable 20 of the optical disk device 71 according to the first embodiment, FIG. 3 (c) is a back side view of the turntable 20 of the optical disk device 71 according to the first embodiment, and FIG. 3 (d) is an L to L sectional view of the optical disk device 71 according to the first embodiment.
Figure 3:
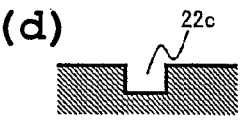
Figure 3:
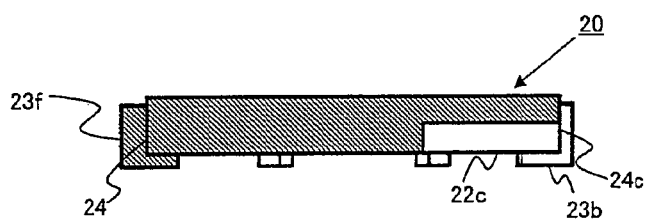
Figure 3:
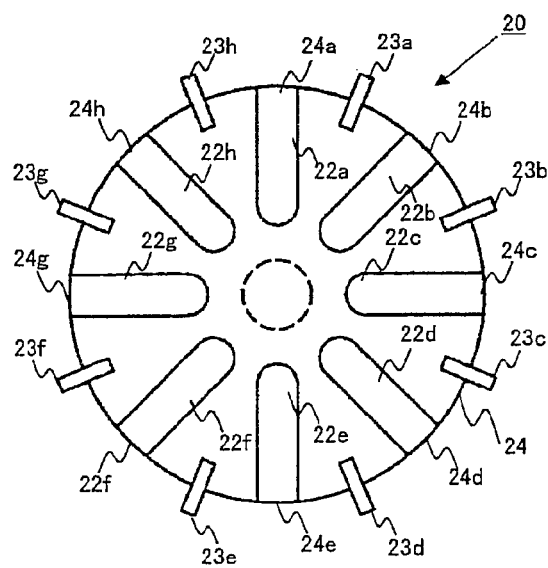

FIG. 3 (a) is a top view of the turntable 20 (surface on the optical disk 14 side). FIG. 3 (b) is an A to A sectional view of the turntable 20. FIG. 3 (c) is a back side view of the turntable 20 (surface on the spindle motor 17 side). As shown in FIGS. 3 (a) to 3 (d), concave portions and convex portions are provided on the surface of the turntable 20.

Plural induction grooves 22a to 22h as the concave portions of the present invention are provided on a backside of the turntable 20. The plural induction grooves 22a to 22h are the grooves radially extending from vicinity of the center of the turntable 20 and including open portions 24a to 24h in an outer periphery 24 of the turntable 20 respectively. Fins 23a to 23h as the convex portions of the present invention are provided in the outer periphery 24 of the turntable 20. The fins 23a to 23h are plate-like projections of a fixed thickness. A cross-section of the induction groove 22c is shown in FIG. 3 (d) which is an L to L sectional view of FIG. 3 (b).

Next, a description will be given as to a basic operation whereby the optical disk device 71 generates the dust removing wind.

Here, by way of example, the optical disk 14 is mounted on the optical disk device 71. If the turntable 20 having the optical disk 14 mounted thereon rotates in conjunction with driving of the spindle motor 17, an airflow is generated by the plural induction grooves 22a to 22h and fins 23a to 23h. This airflow flows toward the radial direction of the turntable 20. The radial direction refers to a direction toward the outer periphery from the center of the optical disk 14. This airflow reaches the objective lens side area, and also removes the dust attaching to the objective lens side area as the dust removing wind.

The optical disk device 71 can thereby remove the dirt, dust and the like attaching to the protection members 13a to 13c, the surface of the optical disk 14 and the like. Therefore, even if a clash occurs between the protection members 13a to 13c and the optical disk 14, it is possible to reduce the possibility of generating a flaw on the surface of the optical disk 14.

Figure 4:
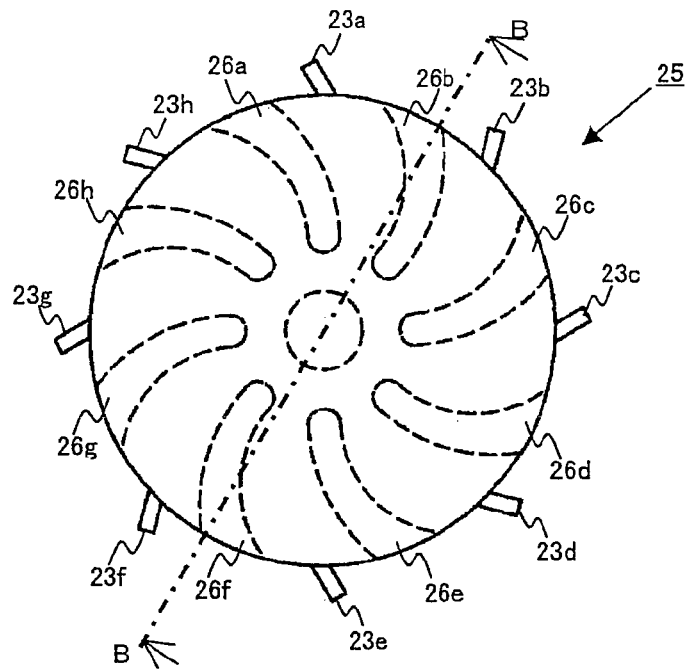
FIG. 4 (a) is a top view of a turntable 25 of the optical disk device 71 according to the first embodiment, FIG. 4 (b) is a B to B sectional view of the turntable 25 of the optical disk device 71 according to the first embodiment, and FIG. 4 (c) is a back side view of the turntable 25 of the optical disk device 71 according to the first embodiment.
Figure 4:
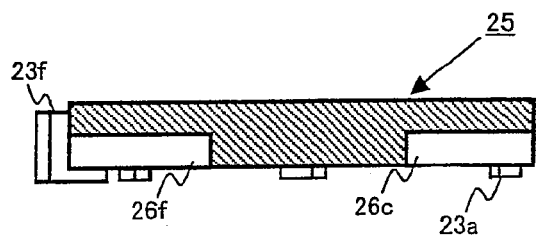
Figure 4:
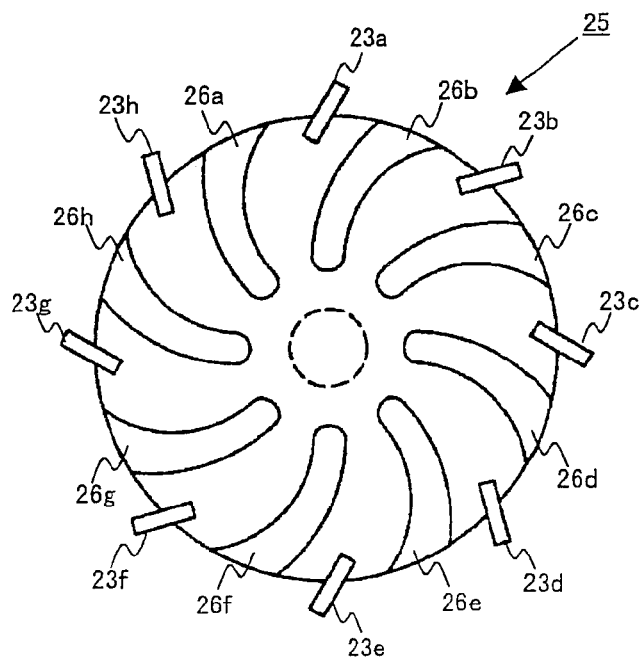

In this embodiment, the plural induction grooves 22a to 22h may also be plural induction grooves 26a to 26h which are radially formed as if drawing an arc from the vicinity of the center of a turntable 25 like the turntable 25 shown in FIGS. 4 (a) to 4 (c).

The plural fins 23a to 23h may be either formed by an elastic body or integrally formed with the turntable.

The spindle motor 17 may be either an inner rotor type or an outer rotor type.

For convenience sake, the embodiment described the case where the optical disk 14 is mounted on the optical disk device 71. However, it is not limited thereto, and the optical disk 14 does not always have to be mounted. In that case, it is possible to remove the dirt, dust and the like attaching to the surfaces of the protection members 13a to 13c and the like. Therefore, even if a clash occurs between the protection members 13a to 13c and the optical disk 14, it is possible to reduce the possibility of generating a flaw on the surface of the optical disk 14.

Timing for driving the spindle motor and a driving period will be described in detail in a sixth embodiment and thereafter.

Second Embodiment

Figure 5:
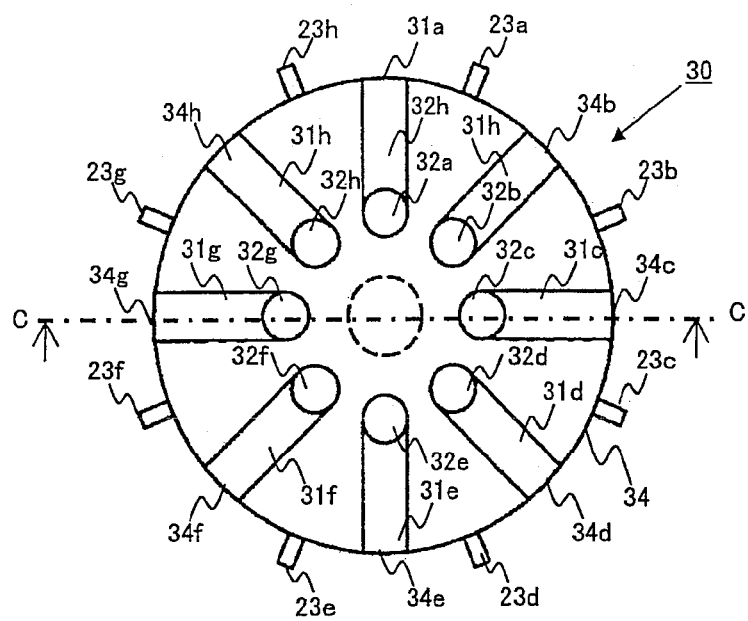
FIG. 5 (a) is a top view of a turntable 30 of the optical disk device according to a second embodiment, FIG. 5 (b) is a C to C sectional view of the turntable 30 of the optical disk device according to the second embodiment, and FIG. 5 (c) is a back side view of the turntable 30 of the optical disk device according to the second embodiment.
Figure 5:
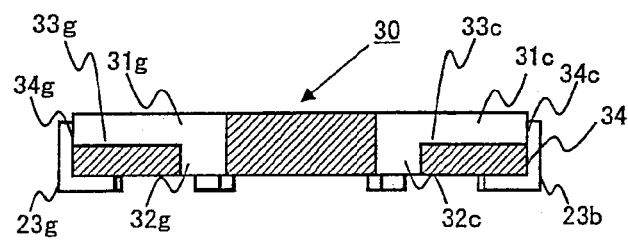
Figure 5:
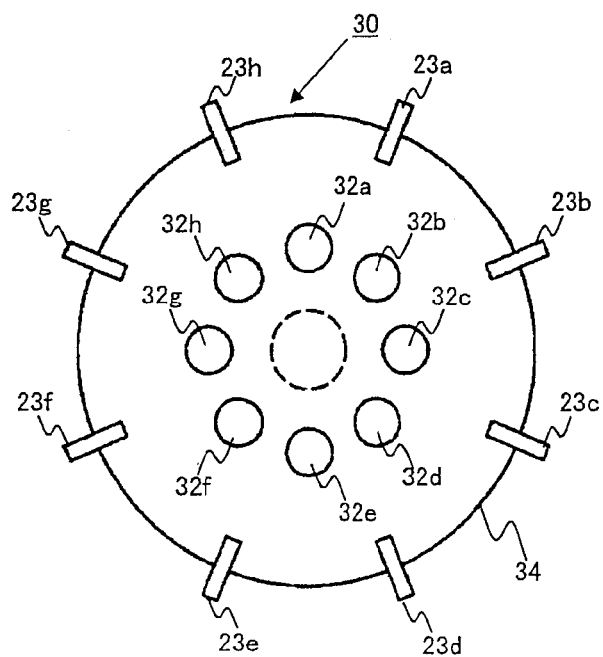

FIG. 5 (a) is a top (surface on the optical disk 14 side) view of a turntable 30 of the optical disk device according to a second embodiment of the present invention. FIG. 5 (b) is a C to C sectional view of the turntable 30. FIG. 5 (c) is a back side (surface on the spindle motor 17 side) view of the turntable 30.

Hereunder, the optical disk device according to the second embodiment of the present invention will be described by using FIGS. 5 (a) to (c).

The optical disk device of the second embodiment and the optical disk device 71 of the first embodiment are only different in the structure of the turntable. For this reason, this embodiment will mainly describe the structure of the turntable 30.

The plural fins 23a to 23h as convex portions which are the same as the turntable 20 described in the first embodiment are formed in an outer periphery 34 of the turntable 30.

As shown in FIGS. 5 (b) and 5 (c), plural induction grooves 31a to 31h as concave portions of the present invention are provided on a top surface of the turntable 30. The plural induction grooves 31a to 31h are the grooves which are radially extended from the vicinity of the center of the turntable 30 and include open portions 34a to 34h in the outer periphery 34 of the turntable 30 respectively. The turntable 30 is also provided with plural through-holes 32a to 32h which penetrate respective bottom faces 33a to 33h on the vicinity of the center side of the plural induction grooves 31a to 31h and the backside of the turntable 30. In FIGS. 5 (a) to 5 (c), the plural induction grooves 31a to 31h are corresponding to the plural through-holes 32a to 32h one on one. However, this neither prevents the plural through-holes from being provided to one induction groove nor prevents the plural induction grooves from sharing one through-hole.

Next, a description will be given as to the basic operation whereby the optical disk device according to the second embodiment generates the dust removing wind.

If the turntable 30 having the optical disk 14 mounted thereon rotates in conjunction with driving of the spindle motor 17, air flows into the plural through-holes 32a to 32h. The air having flowed in passes through space between the optical disk 14 and the plural induction grooves 31a to 31h, and is emitted in the radial direction of the turntable 30 from the open portions 34a to 34h. The emitted air reaches the objective lens side area and also removes the dust attaching to the objective lens side area as the dust removing wind. As the dust removing wind flows on the surface of the optical disk 14, it removes the dust attaching to the surface of the optical disk 14.

Thus, the optical disk device according to the second embodiment can remove the dirt, dust and the like attaching to the protection members 13a to 13c, the surface of the optical disk 14 and the like. Therefore, even if a clash occurs between the protection members 13a to 13c and the optical disk 14, it is possible to reduce the possibility of generating a flaw on the surface of the optical disk 14.

Air volume of the dust removing wind generated by rotation of the turntable 30 is larger than the air volume of the dust removing wind generated by rotation of the turntable 20 in the first embodiment. Therefore, the optical disk device according to the second embodiment can have a greater effect of removing dust than the optical disk device 71 according to the first embodiment.

It was described that the plural induction grooves 31a to 31h provided on the turntable 30 are radially provided toward the outer periphery from the vicinity of the center of the turntable 30. As shown in FIGS. 4 (a) to 4 (c), however, they may also be formed radially and as if drawing an arc from the vicinity of the center of the turntable 30.

Third Embodiment

Figure 6:
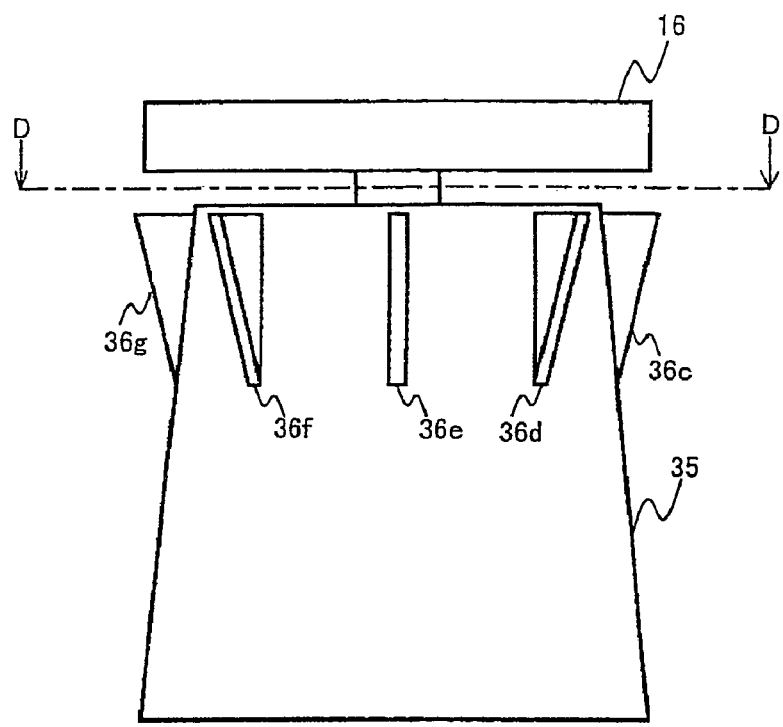
FIG. 6 (a) is a side view of a spindle motor 35 of the optical disk device according to a third embodiment, and FIG. 6 (b) is a D to D sectional view of the spindle motor 35 of the optical disk device according to the third embodiment.
Figure 6:
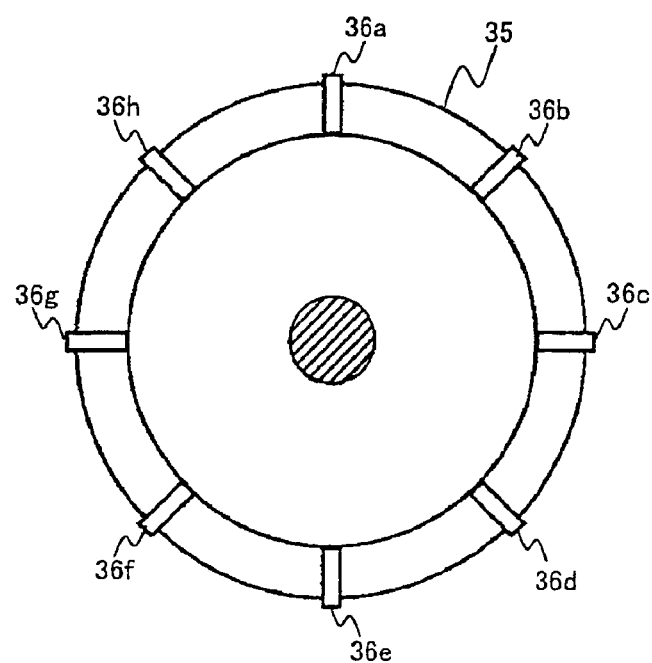

FIG. 6 (a) is a side view of a spindle motor 35 and a turntable 16 of the optical disk device according to a third embodiment of the present invention. FIG. 6 (b) is a D to D sectional view of FIG. 6 (a). To be more specific, FIG. 6 (b) is a diagram in which the spindle motor 35 is viewed from the turntable 16 side. Hereunder, a description will be given as to the optical disk device according to the third embodiment of the present invention.

The optical disk device according to the third embodiment has the turntable 20 of the optical disk device 71 shown in FIG. 2 replaced by the conventional turntable 16 and also has the spindle motor 17 replaced by the spindle motor 35. Otherwise, the configuration of the optical disk device according to the third embodiment is the same as the configuration of the optical disk device 71 described in the first embodiment, and so a description thereof will be omitted.

First, the structure of the spindle motor 35 will be described.

The spindle motor 35 is an outer rotor type spindle motor, which is provided with convex portions on a rotor on a side face thereof. As shown in FIG. 6 (a), the spindle motor 35 is provided with plural fins 36a to 36h as convex portions on the rotor. The plural fins 36a to 36h are placed vertically to the turntable 16. The plural fins 36a to 36h are only required to have an air sending function, and are not required to be vertical to the turntable 16.

The spindle motor 35 needs to secure the space for providing the plural fins 36a to 36h. For this reason, a diameter of the rotor of the spindle motor 35 becomes smaller as it comes closer to the turntable 16 as shown in FIG. 6 (a).

The spindle motor 35 may be provided with plural grooves as concave portions. In this case, the plural induction grooves are provided inclining to the turntable 16 to an extent of fulfilling the air sending function.

Next, a description will be given as to the basic operation whereby the optical disk device according to the third embodiment generates the dust removing wind.

If the rotor of the spindle motor 35 rotates, an airflow is generated by the plural fins 36a to 36h in the radial direction of the turntable 16 having the optical disk 14 mounted thereon. This airflow reaches the objective lens side area, and also removes the dust attaching to the objective lens side area and the surface of the optical disk 14 as the dust removing wind.

The optical disk device according to the third embodiment can thereby remove the dirt, dust and the like attaching to the protection members 13a to 13c, the surface of the optical disk 14 and the like. Therefore, even if a clash occurs between the protection members 13a to 13c and the optical disk 14, it is possible to reduce the possibility of generating a flaw on the surface of the optical disk 14.

The plural fins 36a to 36h may be either formed by an elastic body such as rubber or integrally formed with the turntable.

Fourth Embodiment

Figure 7:
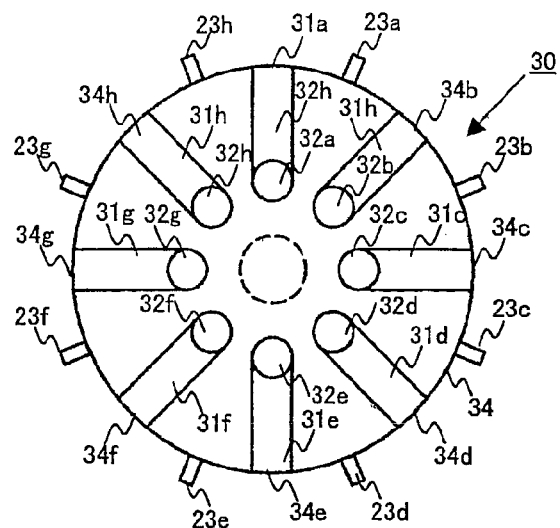
FIG. 7 (a) is a back side view of the turntable 30 and spindle motor 35 of the optical disk device according to a fourth embodiment.
Figure 7:
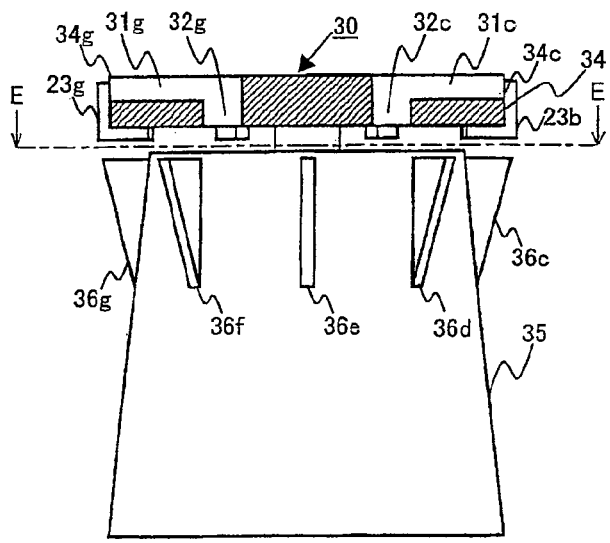
Figure 7:
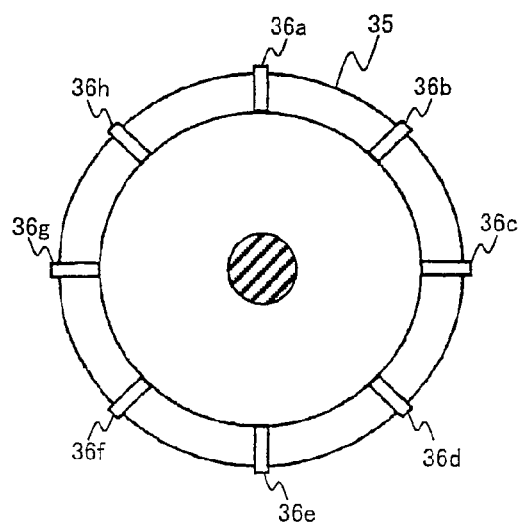

FIG. 7 (a) is a diagram of the spindle motor 35 and turntable 30 of the optical disk device according to a fourth embodiment of the present invention viewed from the optical disk 14 mounting surface side. FIG. 7 (b) is a side view of the spindle motor 35 and turntable 30 of the optical disk device according to the fourth embodiment including partial cross-sections. FIG. 7 (c) is an E to E sectional view of FIG. 7 (b).

The optical disk device according to the fourth embodiment has a configuration in which the turntable 30 according to the second embodiment is combined with the spindle motor 35 according to the fourth embodiment. Otherwise, the configuration of the optical disk device according to the fourth embodiment is the same as the configuration of the optical disk device 71 described in the first embodiment, and so a description thereof will be omitted.

Next, a description will be given as to the basic operation whereby the optical disk device according to the forth embodiment generates the dust removing wind.

In conjunction with driving of the spindle motor 35, an airflow is generated in the radial direction of the turntable 30 by the turntable 30 having the optical disk 14 mounted thereon and the spindle motor 35. This airflow reaches the objective lens side area, and also removes the dust attaching to the objective lens side area and the surface of the optical disk 14 as the dust removing wind.

Thus, the dust removing wind is generated by using the turntable 30 and spindle motor 35. Therefore, the optical disk device according to the forth embodiment can generate the dust removing wind of larger air volume than the optical disk devices according to the first to third embodiments. Consequently, the optical disk device according to the forth embodiment can remove the dirt, dust and the like attaching to the protection members 13a to 13c, the surface of the optical disk 14 and the like. Therefore, even if a clash occurs between the protection members 13a to 13c and the optical disk 14, it is possible to reduce the possibility of generating a flaw on the surface of the optical disk 14.

The optical disk device according to the fourth embodiment may use the turntable 20 or the turntable 25 instead of the turntable 30.

Fifth Embodiment

Figure 8:
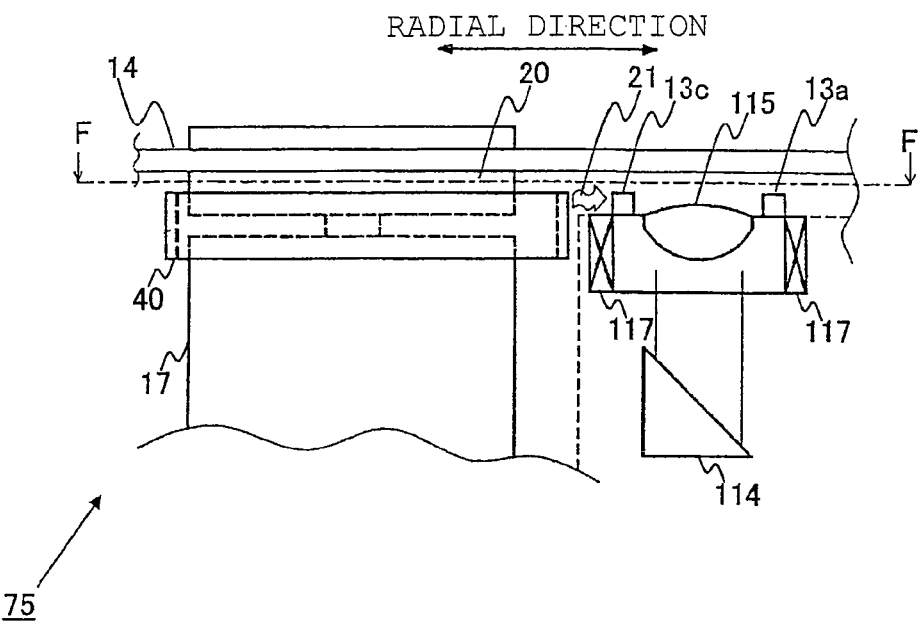
FIG. 8 (a) is a sectional view of the optical disk device according to a fifth embodiment, and FIG. 8 (b) is an F to F sectional view of the optical disk device according to the fifth embodiment.
Figure 8:
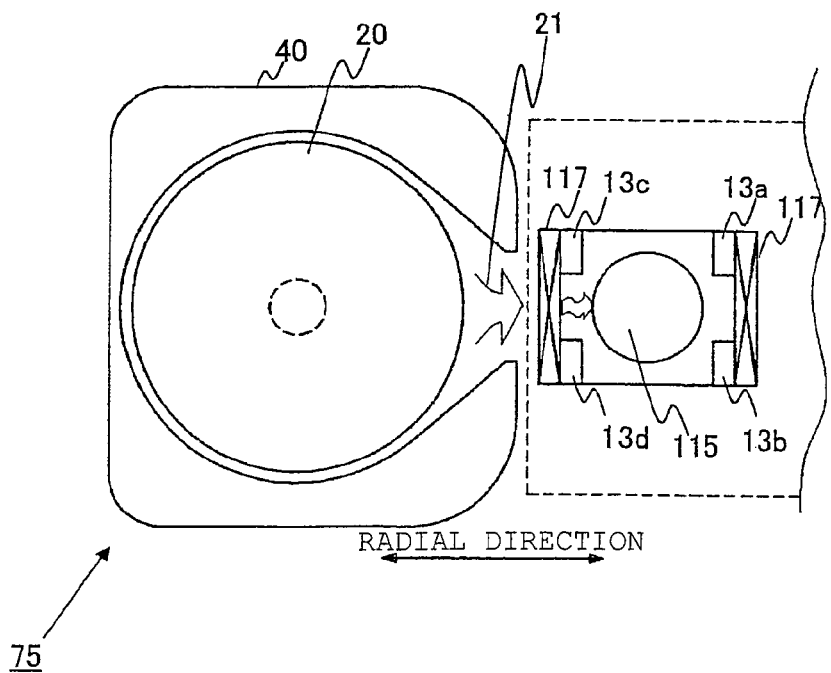

FIG. 8 (a) is a diagram showing vicinity of the spindle motor 17 and turntable 20 of an optical disk device 75 according to a fifth embodiment of the present invention. FIG. 8 (b) is a diagram of the optical disk device 75 viewed from an F to F direction of FIG. 8 (a).

The optical disk device 75 has a configuration in which the optical disk device 71 according to the first embodiment further includes an induction plate 40. For this reason, a description will be omitted as to the configuration of the optical disk device 75 other than the induction plate 40.

First, the structure of the induction plate 40 will be described by using FIGS. 8 (a) and 8 (b).

The induction plate 40 surrounds outer circumferences of both the rotor of the spindle motor 17 and turntable 20, and includes an opening in the direction of the protection members 13a to 13d of the optical head 11. The induction plate 40 is installed independently from the spindle motor 17 and turntable 20.

Next, a description will be given as to the basic operation whereby the optical disk device 75 generates the dust removing wind.

In conjunction with driving of the spindle motor 17, an airflow is generated in the radial direction of the turntable 20 by rotation of the turntable 20 having the optical disk 14 mounted thereon. The induction plate 40 induces all the airflows generated in the radial direction of the turntable 20 toward the direction of the optical head 11. The induced airflows reach the objective lens side area and remove the dust attaching to the objective lens side area as the dust removing wind.

Thus, the optical disk device 75 can generate the dust removing wind of much larger air volume than the optical disk device 71 according to the first embodiment. Consequently, the optical disk device 75 can increase the possibility of removing dust in comparison with the optical disk device 71 according to the first embodiment.

The induction plate 40 may also be provided to surround at least one of the rotor of the spindle motor 17 and the turntable 20.

The optical disk devices according to the second to fourth embodiments may also include the induction plate 40.

Sixth Embodiment

Here, a description will be given as to a driving method of the spindle motor as an example of a control method of the optical disk device according to the present invention.

The optical disk device according to a sixth embodiment of the present invention has the same configuration as the optical disk device 71 according to the first embodiment. Therefore, a description will be omitted as to the configuration of the optical disk device according to the sixth embodiment. Instead, a description will be given as to a concrete driving method of the spindle motor of the optical disk device according to the sixth embodiment for the sake of generating the dust removing wind.

First, a description will be given as to a basic driving method (first driving method) of the spindle motor.

The optical disk device according to the sixth embodiment drives the spindle motor 17 in predetermined timing for a predetermined period according to whether or not the optical disk 14 is mounted on the turntable 20.

To be more specific, the optical disk device according to the sixth embodiment drives the spindle motor 17 in predetermined timing to generate the dust removing wind in the case where the optical disk 14 is mounted and no recording/reproduction operation is being performed. It is thereby possible to remove the dust attaching to the surface of the optical disk 14 and the periphery of the objective lens. Here, as for the predetermined timing, it is thinkable to drive it for a certain time period every hour for instance.

Even in the case where the optical disk 14 is not mounted on the optical disk device, it is possible to remove the dust attaching to the periphery of the objective lens by driving the spindle motor 17 for a certain time period every hour, every few hours, every other day or every few days. Here, the timing for driving the spindle motor 17 may be either differentiated or the same between the case where the optical disk 14 is mounted thereon and the case where the optical disk 14 is not mounted thereon.

It is thereby possible to reduce the possibility that a flaw may be generated on the surface of the optical disk by the dust.

Next, another driving method (second driving method) of the spindle motor will be described. Apart from the configuration for applying the first driving method, the optical disk device according to the sixth embodiment includes a detection sensor (not shown) which can sense a user's operation for mounting the optical disk 14, such as the user opening a lid of the optical disk device. In that case, it is possible, with a detection signal of the detection sensor, to drive the spindle motor 17 in a positive or reverse rotation direction of the optical disk just for a short time in advance immediately before the optical disk 14 is mounted on the turntable 20. It is thereby possible to remove the dust attaching to the periphery of the objective lens in advance before the optical disk 14 is mounted so that the possibility of generating a flaw on the optical disk 14 can be reduced.

As for the second driving method, in the case of rotating the optical disk in the reverse rotation direction of the turntable 20, the optical disk device according to the sixth embodiment subsequently switches a mode to the positive rotation direction and then stops the rotation. In this case, the rotation of the turntable 20 may be either completely stopped or incompletely stopped.

This is intended to render the optical disk device according to the sixth embodiment readily usable by the user. It is possible, by exerting such rotation control, to reduce a rise time of the rotation of the mounted optical disk 14 and thus immediately obtain the data of the optical disk 14. Therefore, the dust in a peripheral area of the objective lens can be removed without impairing convenience for the user.

As a matter of course, the second driving method may be combined with the first driving method.

Next, a further driving method (third driving method) of the spindle motor will be described. When driving the spindle motor 17, the optical disk device according to the sixth embodiment changes the rotation direction of the turntable 20. For instance, the optical disk device according to the sixth embodiment changes the direction of the dust removing wind by alternately driving the spindle motor 17 in the positive rotation direction and the reverse rotation direction of the turntable 20. The positive rotation direction is a direction in which the optical disk device rotates the optical disk when performing the recording/reproduction operation of the optical disk. The reverse rotation direction is a reverse direction to the positive rotation direction. It is possible to remove the dust attaching to the objective lens 115 and the surface of the optical disk by changing the direction of the dust removing wind.

Next, a still further driving method (fourth driving method) of the spindle motor will be described. When driving the spindle motor 17, the optical disk device according to the sixth embodiment changes rotation speed of the turntable 20 so as to change wind speed of the dust removing wind.

As with the second and third driving methods of the spindle motor 17, the optical disk device according to the sixth embodiment can render the dust removing wind turbulent by changing the wind speed or the direction of the dust removing wind. Thus, the effect of removing the dust attaching to the periphery of the objective lens and the surface of the optical disk becomes greater than that of the optical disk device 71 according to the first embodiment.

The third or fourth driving method may be combined with the first and/or second driving method.

It goes without saying that the same effect can be obtained by using the driving method of the spindle motor of this embodiment for the optical disk devices according to the first to fifth embodiments.

Seventh Embodiment

Here, a description will be given as to the control method of the optical head as an example of the control method of the optical disk device according to the present invention.

The optical disk device according to a seventh embodiment of the present invention has the same configuration as the optical disk device 71 according to the first embodiment. Therefore, a description will be omitted as to the configuration of the optical disk device according to the seventh embodiment. Instead, a description will be given by using FIG. 2 as to the control method of the optical head 11 of the optical disk device according to a seventh embodiment by centering on differences from the optical disk device 71 according to the first embodiment. The basic operation is the same as that of the optical disk device 71 according to the first embodiment.

The direction of an arrow F, an arrow T or an arrow R shown in FIG. 2 indicates the direction in which the optical head 11 is movable. A servo control circuit 130 changes the wind speed or the direction of the dust removing wind to the objective lens side area by moving the optical head 11 in the direction of the arrow F, arrow T or arrow R.

The arrow F indicates the direction which is vertical to the surface of the optical disk 14. The servo control circuit 130 reciprocates the optical head 11 in the direction of the arrow F and changes a distance between the objective lens 115 and the optical disk 14. The arrow T indicates the direction which is parallel to the surface of the optical disk 14. The servo control circuit 130 reciprocates the optical head 11 in the direction of the arrow T and thereby changes the distance between the objective lens 115 and the spindle motor 17/turntable 20.

The optical disk device of this embodiment reciprocates the optical head 11 in the directions of the arrow F and arrow T and thereby changes the wind speed of the dust removing wind to the objective lens side area.

The arrow R indicates the direction inclined to the surface of the optical disk 14. The servo control circuit 130 rotates the optical head 11 in the direction of the arrow R and thereby changes inclination of the optical head 11 to the surface of the optical disk 14.

The optical disk device of the seventh embodiment moves the optical head 11 in the direction of the arrow R and thereby changes the direction of the dust removing wind to the optical head so that the dust removing wind can be rendered turbulent.

Therefore, it is possible to further enhance the effect of removing the dust attaching to the peripheral area of the objective lens including the protection members 13a to 13c and the surface of the objective lens side of the optical disk 14 in comparison with that of the optical disk device 71 according to the first embodiment. It is also possible to combine reciprocating movements in the respective directions of the arrow F, arrow T and arrow R.

It goes without saying that the same effect can be obtained by using the driving method of the optical head of this embodiment for the optical disk devices according to the second to fifth embodiments.

Eighth Embodiment

Here, a description will be given as to the control method of the optical head as an example of the control method of the optical disk device according to the present invention.

Figure 9:
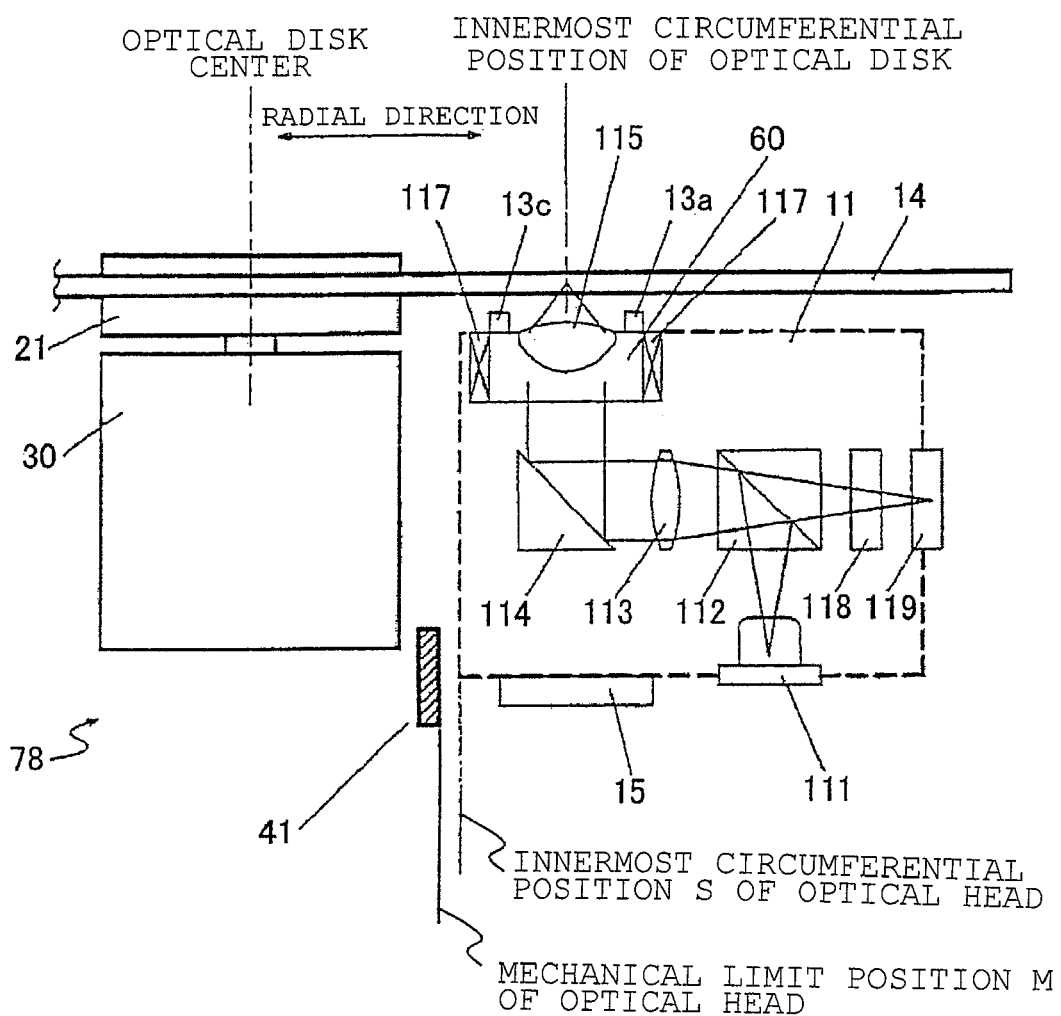
FIG. 9 is a diagram for describing a position of an optical head of the optical disk device according to a sixth embodiment.

FIG. 9 is a diagram for describing the operation of an optical disk device 78 according to an eighth embodiment of the present invention. The optical disk device 78 has a configuration in which a stopper 41 is further provided to the configuration of the optical disk device 71 according to the first embodiment shown in FIGS. 1 to 3. For this reason, a description of the configuration other than the stopper 41 of the optical disk device 78 will be omitted. Instead, a description will be given by using FIG. 9 as to the control method of the optical head 11 of the optical disk device 78 by centering on differences from the optical disk device 71 according to the first embodiment. The basic operation is the same as that of the optical disk device 71 according to the first embodiment.

In the optical disk device 78, the servo control circuit 130 moves the optical head 11 to a predetermined position before driving the spindle motor 17. As shown in FIG. 9, the predetermined position of the optical head 11 is a mechanical limit position M of the optical head or an innermost circumferential position S of the optical head.

The mechanical limit position M of the optical head 11 refers to a limit position from which it is physically impossible to further move the optical head 11 to the inner circumferential side in the radial direction. To decide the mechanical limit position M of the optical head 11, as shown in FIG. 9, the stopper 41 was installed for the sake of stopping movement of the optical head 11 to the inner circumferential direction in the radial direction of the optical disk 14. It may also be a configuration in which a sensor for detecting an optical head position (not shown) is provided in advance instead of the stopper 41. In that case, it may also be a configuration in which the servo control circuit 130 stops the movement of the optical head 11 at a time point when the position detecting sensor detects the optical head 11 at the mechanical limit position M for instance.

The innermost circumferential position S of the optical disk refers to a position where the data is recordable or reproducible, exiting on the innermost circumferential side in the radial direction of the optical disk 14. The innermost circumferential position S of the optical head refers to a position of the optical head 11 for the sake of forming a light spot in the innermost circumferential position on the optical disk. To be more specific, the mechanical limit position M of the optical head is closer to the spindle motor 17 than the innermost circumferential position on the optical disk.

Thus, the optical disk device 78 can increase the wind speed of the dust removing wind to the objective lens side area by moving the optical head 11 close to the turntable 20 and spindle motor 17. Therefore, the optical disk device 78 can render the effect of removing the dust attaching to the objective lens side area greater than that of the optical disk device 71 according to the first embodiment.

In this embodiment, it goes without saying that the turntable 25 or the turntable 30 may be used instead of the turntable 20, and the spindle motor 35 may be used instead of the spindle motor 17.

The first to eighth embodiments described the examples wherein the optical disk 14 is mounted on the optical disk device 71 for convenience sake. However, it is not limited thereto. Even if the optical disk 14 is not mounted, the same effects as the above can be fulfilled.

It is also possible to apply the driving methods of the optical disk according to the sixth to eighth embodiments to the optical disk devices according to the first to fifth embodiments. Even in that case, it is possible to effectively remove the dust attaching to the periphery of the optical disk or the periphery of the objective lens as in the cases as above.

Ninth Embodiment

Here, a description will be given by using FIGS. 10A and 10B as to an embodiment of the optical disk device of the present invention.

Figure 10A:
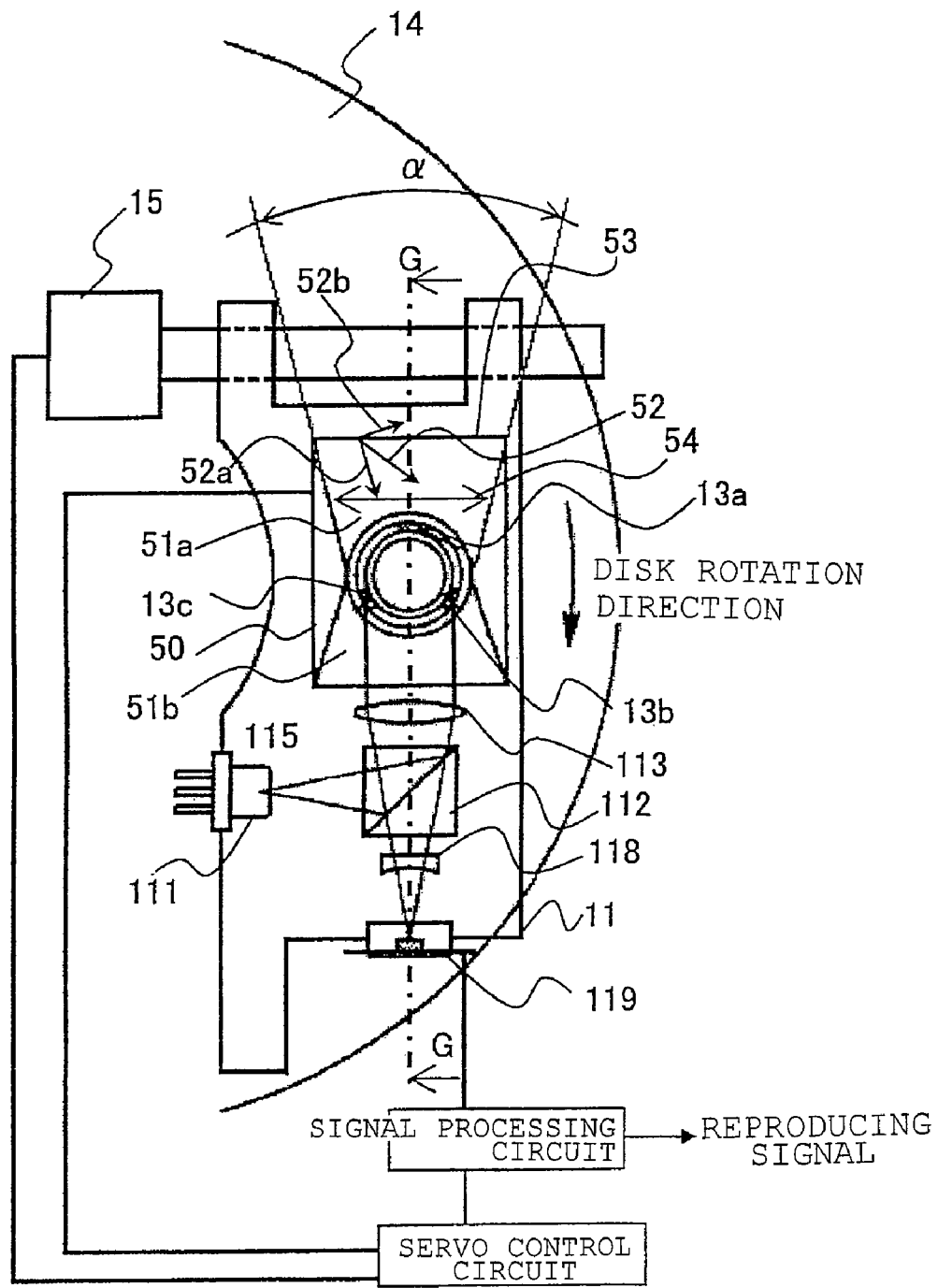
FIG. 10A is a top view of the optical disk device according to a ninth embodiment.

FIG. 10A is a top view of an optical disk device 79 according to a ninth embodiment of the present invention. FIG. 10B is a G to G sectional view of the optical disk device 79 shown in FIG. 10A.

Figure 10B:
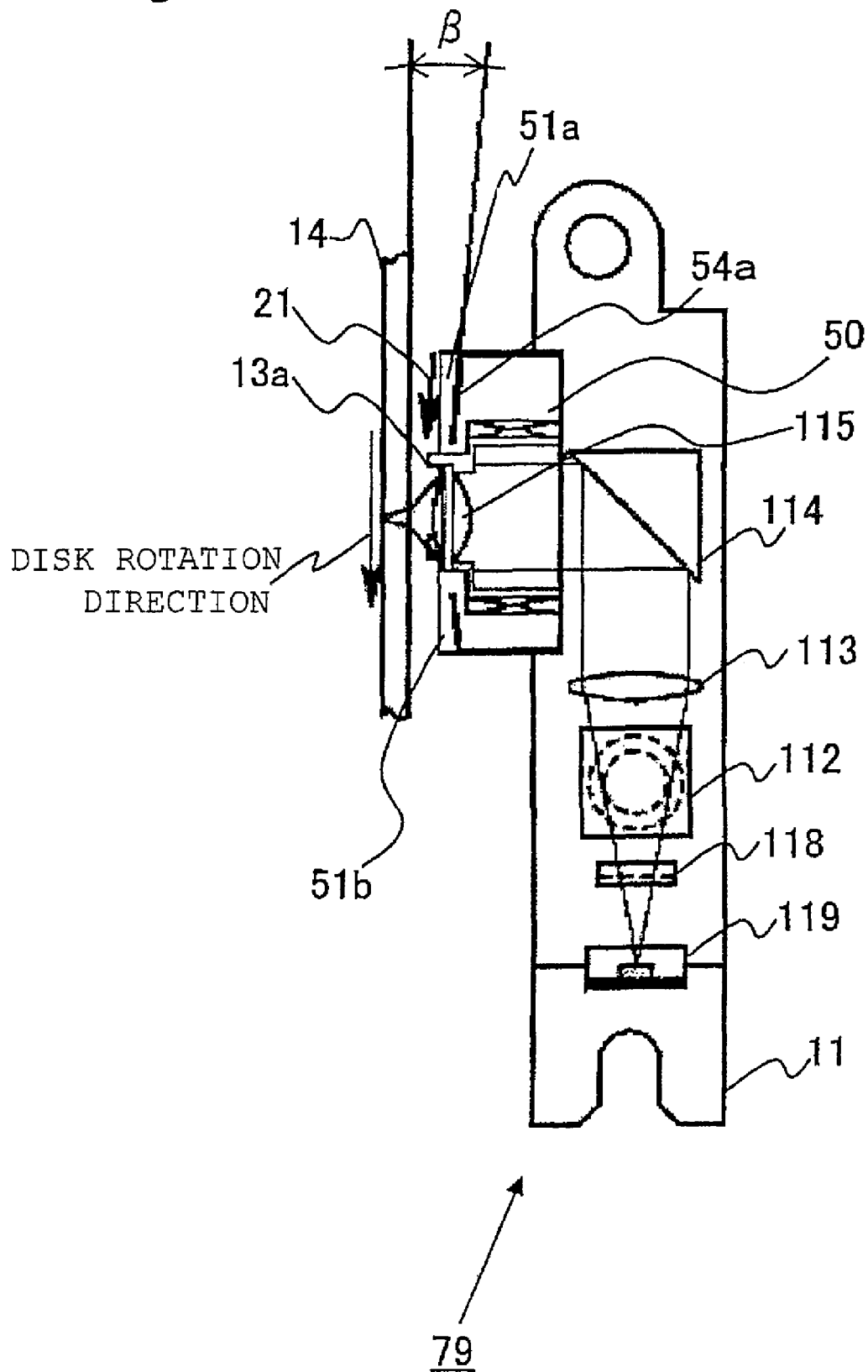
FIG. 10B is a G to G sectional view of the optical disk device according to the ninth embodiment.

The blocks constituting the optical disk device 79 shown in FIGS. 10A and 10B for performing the same operation as the blocks constituting the conventional optical disk device 90 are given the same reference marks as those for the blocks constituting the conventional optical disk device 90, and a description thereof will be omitted.

The following description will be given on the basis that the optical disk 14 is mounted on the optical disk device 79. This is because the optical disk device 79 utilizes the airflow generated by the rotation of the optical disk 14 and viscosity of air as the dust removing wind.

Hereunder, the configuration of the optical disk device 79 will be described.

The optical disk device 79 includes an actuator cover 50 instead of an actuator cover 18. The actuator cover 50 includes a first groove 51a and a second groove 51b as airflow guide portions on a surface opposed to the optical disk 14. The first groove 51a and second groove 51b are provided in circumferential directions of the optical disk 14 of the actuator cover 50 by centering on the objective lens 115 respectively. It is not necessary to have two grooves, but it is sufficient to have one provided in one of the circumferential directions of the optical disk 14.

Subsequently, the first groove 51a and second groove 51b will be described.

The first groove 51a has an open portion 53 on the side face on one circumferential direction side of the actuator cover 50. Width 54 of the first groove 51a becomes gradually narrower as it proceeds from the open portion 53 to the objective lens 115 and becomes smallest on the objective lens 115 side. As shown in FIG. 10A, the first groove 51a should be formed so that an angle made by two side faces forming the first groove 51a becomes $\alpha$ ($\alpha<90°$). Depth of the first groove 51a becomes gradually smaller as it proceeds from the open portion 53 to the objective lens 115 and becomes smallest on the objective lens 115 side. As shown in FIG. 10B, the first groove 51a should be formed so that an angle made by a bottom face 54a of the first groove 51a and the optical disk 14 becomes $\beta$ ($\beta<90°$).

The form of the second groove 51b is the same as that of the first groove 51a, and so a description thereof will be omitted. The form of the first groove 51a and the form of the second groove 51b do not have to be the same.

Next, a description will be given as to a basic operation whereby the optical disk device 79 generates the dust removing wind.

As the air is viscous, if the optical disk 14 rotates, the air on the surface of the optical disk 14 is pulled in the circumferential direction of the optical disk 14 so as to generate an airflow 52a. Furthermore, if the optical disk 14 rotates, an airflow 52b is generated in the radial direction of the surface of the optical disk 14 by a centrifugal force. As a result of this, an airflow 52 having the airflow 52a and airflow 52b combined is generated.

The first groove 51a guides the airflow 52 in the direction of the objective lens 115. As a result of this, the airflow 52 removes the dust attaching to the periphery of the objective lens 115 including the protection members 13a to 13c (hereinafter, referred to as an objective lens peripheral area) as the dust removing wind. The second groove 51b guides an airflow generated by rotation of the optical disk 14 in the reverse direction to the objective lens peripheral area as the dust removing wind so as to remove the dust.

Thus, the optical disk device 79 can remove the dust attaching to the protection members 13a to 13c, the surface of the optical disk 14 and the like. Therefore, even if a clash occurs between the protection members 13a to 13c and the optical disk 14, it is possible to reduce the possibility of generating a flaw on the surface of the optical disk 14.

Tenth Embodiment

Here, a description will be given by using FIG. 11 as to an embodiment of the optical disk device of the present invention.

The configuration of an optical disk device 80 according to the tenth embodiment of the present invention is the same as the configuration of the optical disk device 79 according to the ninth embodiment. Therefore, a description thereof will be omitted, and only the operations different from the optical disk device 79 according to the ninth embodiment will be described. The basic operation thereof is the same as that of the optical disk device 79 according to the ninth embodiment.

Figure 11:
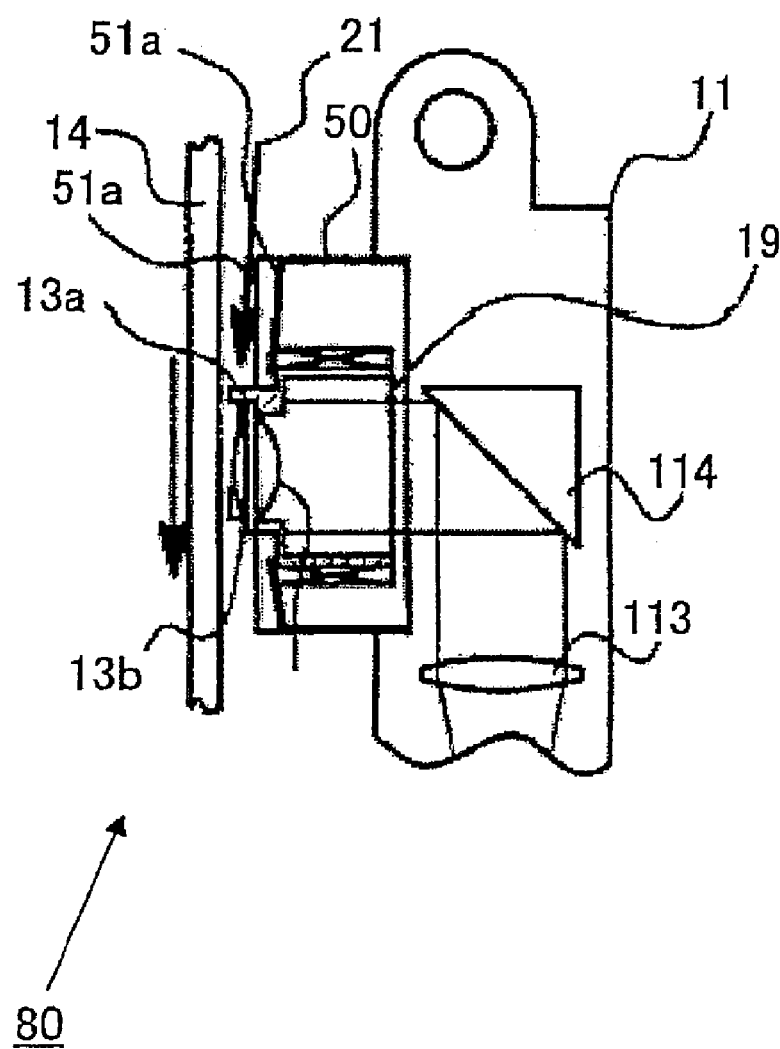
FIG. 11 is a diagram showing enlarged vicinity of an actuator cover 50.

FIG. 11 is a diagram showing enlarged vicinity of an actuator cover 50 of FIG. 10B. The servo control circuit 130 moves an objective lens holder 19 until it contacts the actuator cover 50 by applying a voltage to an actuator coil 117 in a focus direction. Even if the objective lens holder 19 contacts the actuator cover 50, the protection members 13a to 13c do not contact the optical disk 14.

As the objective lens holder 19 is moved until it contacts the actuator cover 50, the objective lens 115 and the protection members 13a to 13c come close to the optical disk 14. As a result of this, the optical disk device 80 can render the wind speed of the dust removing wind to the objective lens side area higher than that of the optical disk device 79.

Therefore, the optical disk device 80 according to the tenth embodiment can have a greater effect of removing dust than the optical disk device 79 according to the ninth embodiment.

Eleventh Embodiment

Here, a description will be given by using FIGS. 12A and 12B as to an embodiment of the optical disk device of the present invention.

Figure 12A:
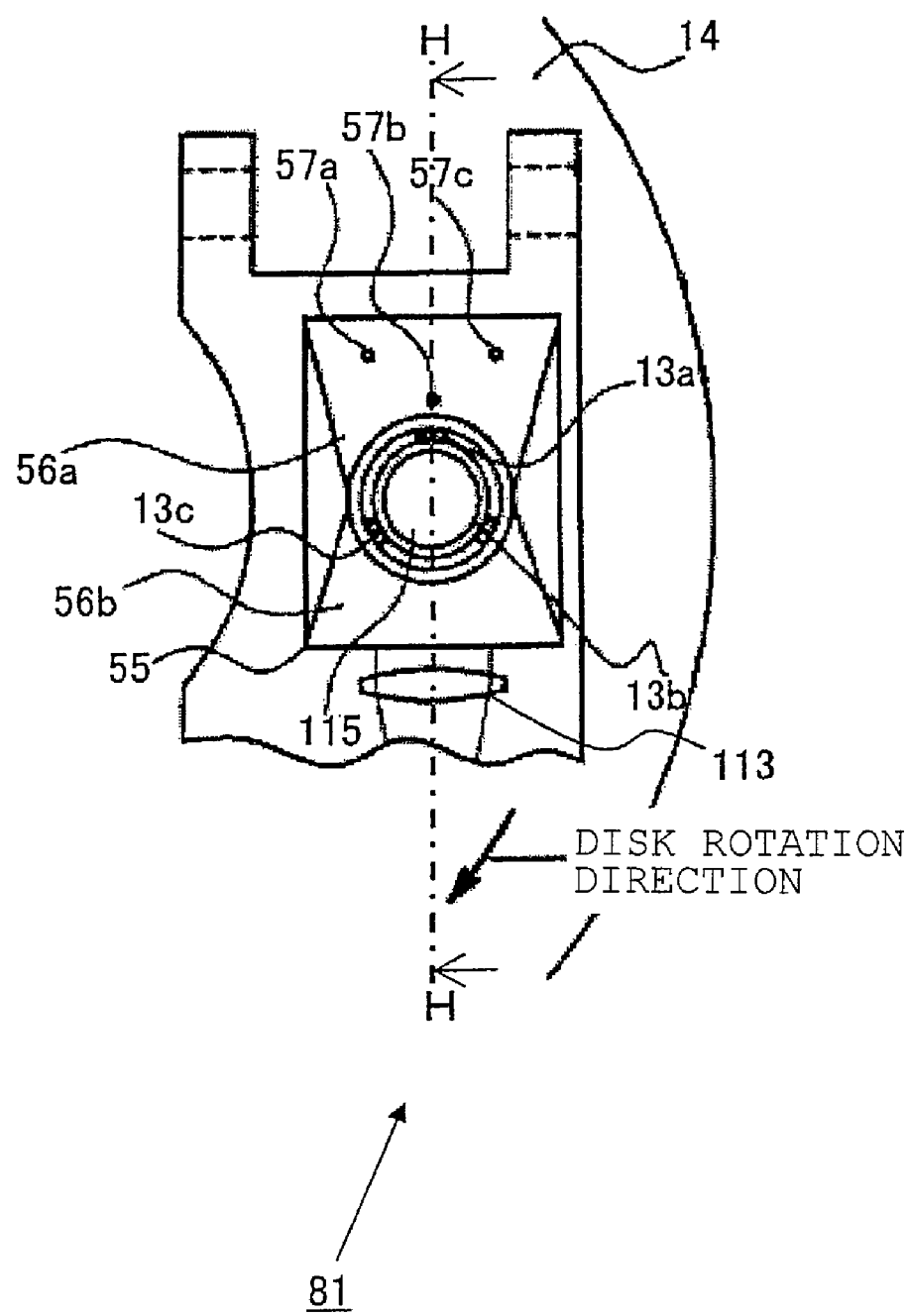
FIG. 12A is a top view of an optical disk device 81 according to an eleventh embodiment.

FIG. 12A is a top view of an optical disk device 81 according to an eleventh embodiment of the present invention. FIG. 12B is an H to H sectional view of the optical disk device 81 shown in FIG. 12A. The optical disk device 81 according to this embodiment is configured to include an actuator cover 55 instead of the actuator cover 50 of the optical disk device 79 according to the ninth embodiment.

For this reason, a description will be omitted as to the configuration other than the actuator cover 55 of the optical disk device 81. Instead, a description will be given by using FIGS. 12A and 12B as to the optical disk device 81 by centering on differences from the optical disk device 79 according to the ninth embodiment. The basic operation is the same as that of the optical disk device 79.

First, the configuration of the actuator cover 55 will be described.

A difference between the actuator cover 50 and the actuator cover 55 is that plural convex portions 57a to 57c are provided on the bottom face of a first groove 56a of the actuator cover 55.

The plural convex portions 57a to 57c are provided in a position where an airflow 58 passes through. For this reason, the plural convex portions 57a to 57c disrupt a current of the airflow 58 when the airflow 58 passes through the first groove 56a. As a result of this, the dust removing wind becomes turbulent so that the optical disk device 81 can have a greater effect of removing the dust attaching to the objective lens peripheral area in comparison with the optical disk device 79.

Figure 12B:
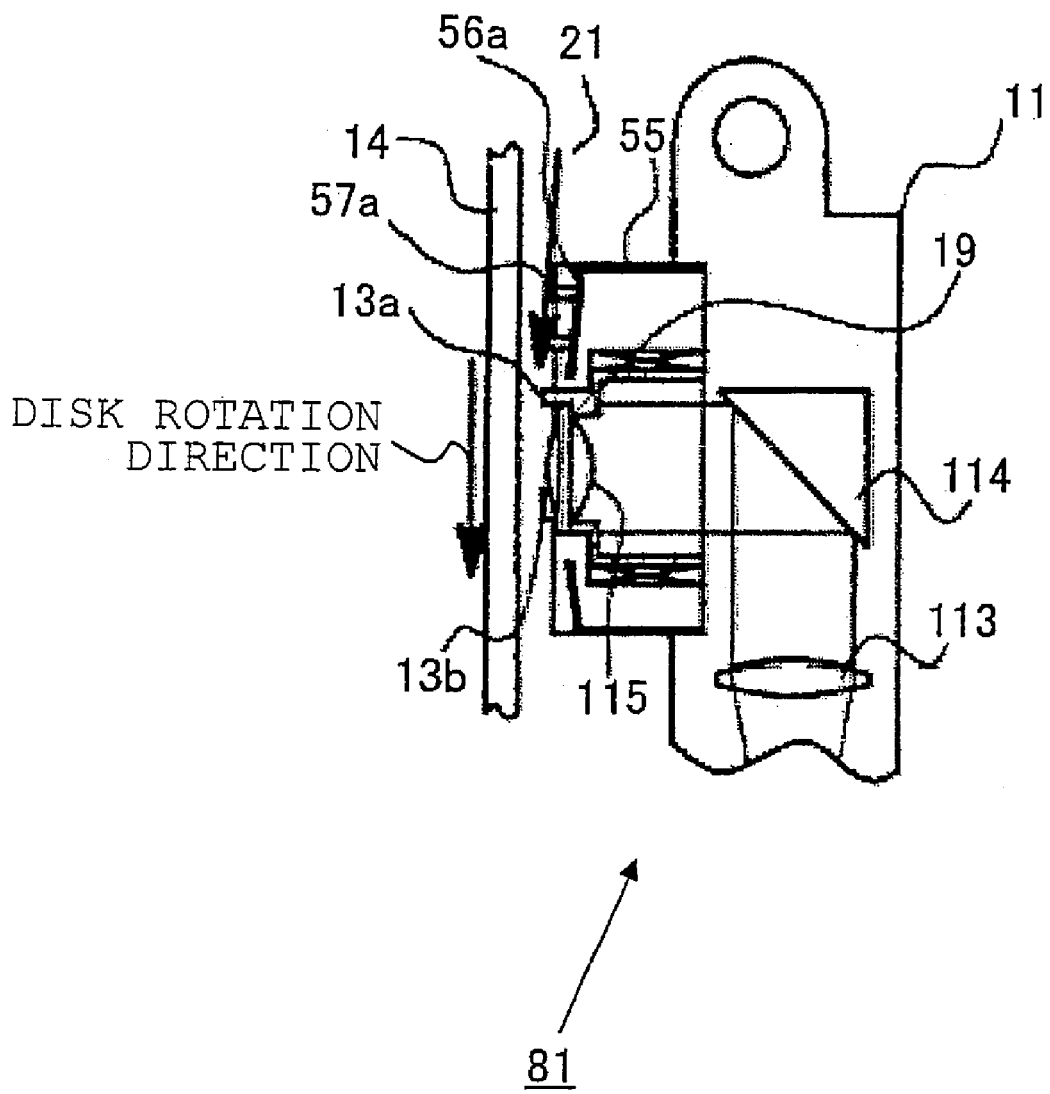
FIG. 12B is an H to H sectional view of the optical disk device 81 according to the eleventh embodiment.

FIGS. 12A and 12B show three convex portions 57a to 57c. However, the number of the convex portions is not limited thereto. The plural convex portions 57a to 57c may also be provided to a second groove 56b.

Twelfth Embodiment

Here, a description will be given as to an embodiment of the optical disk device of the present invention.

Figure 13A:
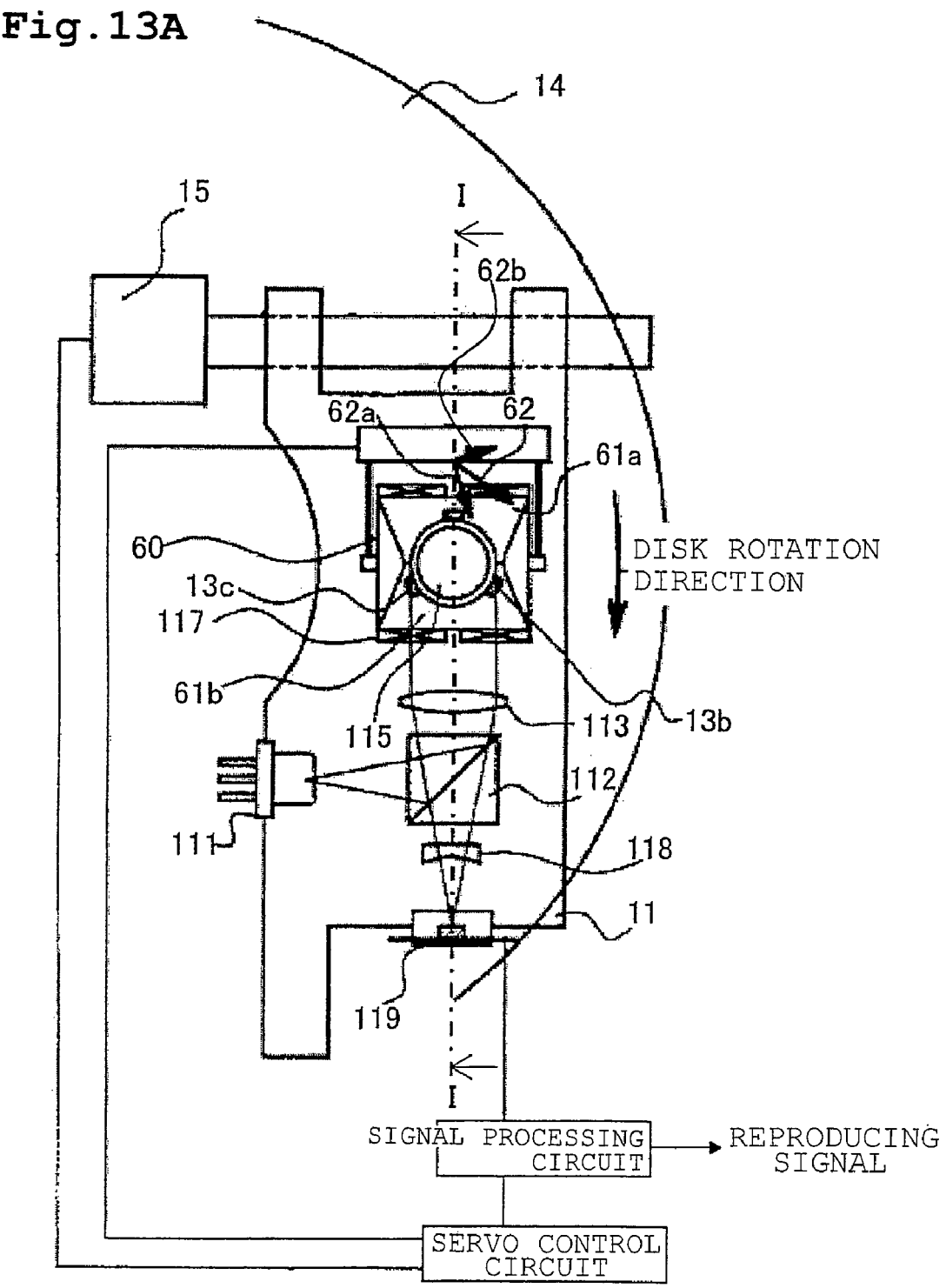
FIG. 13A is a top view of an optical disk device 82 according to a twelfth embodiment.
Figure 13B:
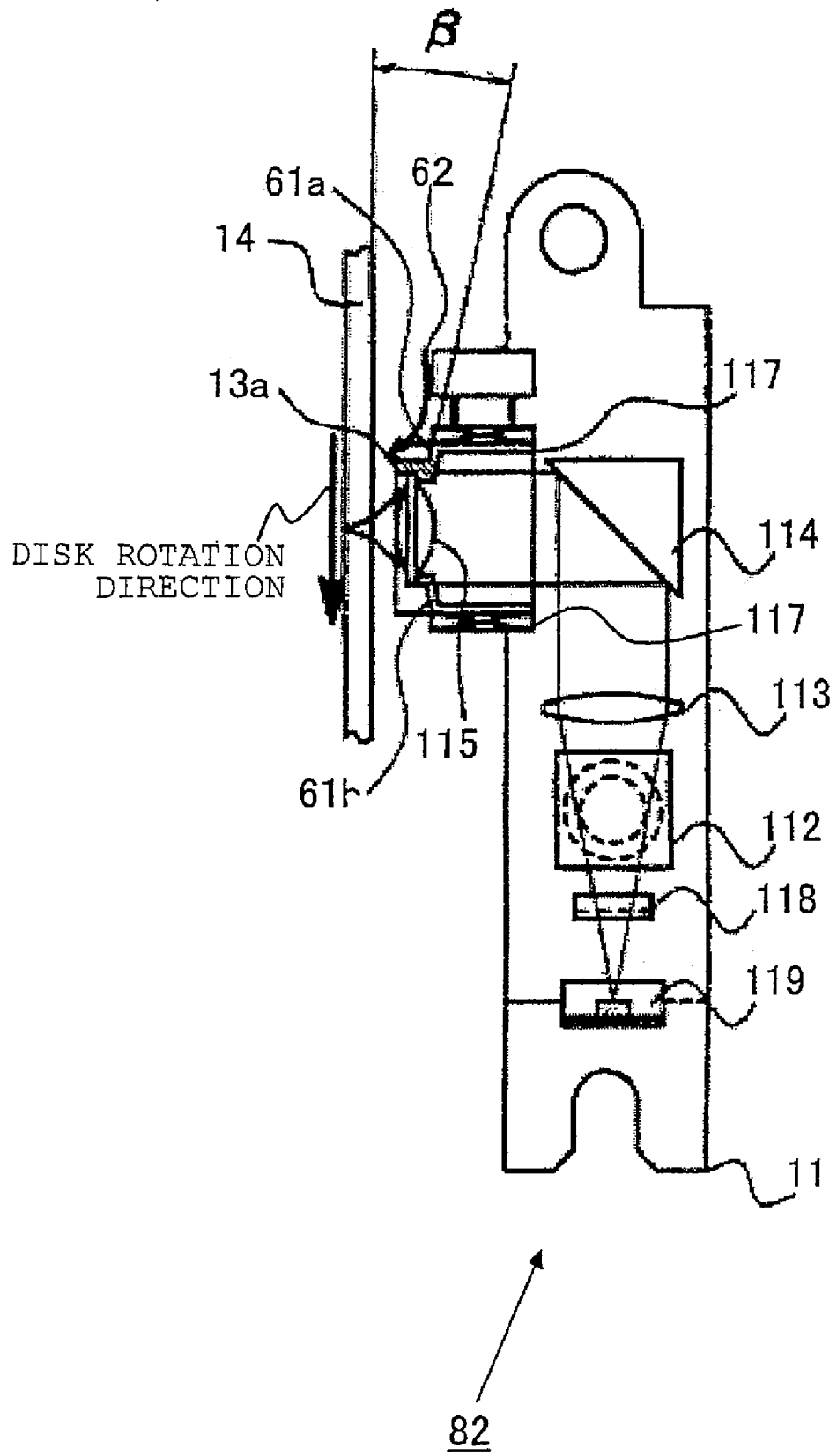
FIG. 13B is an I to I sectional view of the optical disk device 82 according to the twelfth embodiment.

FIG. 13A is a top view of an optical disk device 82 according to a twelfth embodiment of the present invention. FIG. 13B is an I to I sectional view of the optical disk device 82 shown in FIG. 13A.

The blocks constituting the optical disk device 82 shown in FIGS. 13A and 13B for performing the same operation as the blocks constituting the conventional optical disk device 90 are given the same reference marks, and a description thereof will be omitted.

The following description will be given on the basis that the optical disk 14 is mounted on the optical disk device 82 as with the optical disk device 79 according to the ninth embodiment.

First, the configuration of the optical disk device 82 will be described.

Unlike the conventional optical disk device 90, the optical disk device 82 does not include the actuator cover 18. The optical disk device 82 includes an objective lens holder 60 instead of the objective lens holder 19 of the conventional optical disk device 90.

The objective lens holder 60 includes a first groove 61a and a second groove 61b as airflow guide portions on a surface opposed to the optical disk 14. The first groove 61a and second groove 61b are provided in circumferential directions of the optical disk 14 by centering on the objective lens 115 respectively. It is not necessary to have two grooves, but it is sufficient to have one provided in one of the circumferential directions of the optical disk 14.

Subsequently, the first groove 61a and second groove 61b will be described.

The first groove 61a has an open portion on the side face on one circumferential direction side of the objective lens holder 60. Width of the first groove 61a becomes gradually narrower as it proceeds from the open portion to the objective lens 115 and becomes smallest on the objective lens 115 side. As shown in FIG. 13A, an angle made by two side faces forming the first groove 61a should be α ($\alpha<90°$). Depth of the first groove 61a becomes gradually smaller as it proceeds from the open portion to the objective lens 115 and becomes smallest on the objective lens 115 side. As shown in FIG. 13B, an angle made by a bottom face of the first groove 61a and the optical disk 14 should be β ($\beta<90°$).

The form of the second groove 61b is the same as that of the first groove 61a, and so a description thereof will be omitted. The form of the first groove 61a and the form of the second groove 61b do not have to be the same.

Next, a description will be given as to a basic operation whereby the optical disk device 82 generates the dust removing wind.

As described in the ninth embodiment, if the optical disk 14 rotates, an airflow 62a flowing in the circumferential direction of the optical disk 14 and an airflow 62b flowing in the radial direction of the optical disk 14 are generated on the surface of the optical disk 14. As a result of this, an airflow 62 having the airflow 62a and airflow 62b combined is generated.

The first groove 61a guides the airflow 62 to the objective lens peripheral area. As a result of this, the airflow 62 removes the dust attaching to the objective lens peripheral area as the dust removing wind. The second groove 61b guides an airflow generated by rotation of the optical disk 14 in the reverse direction to the objective lens peripheral area as the dust removing wind so as to remove the dust.

Thus, the optical disk device 82 can remove the dirt, dust and the like attaching to the protection members 13a to 13c, the surface of the optical disk 14 and the like. Therefore, even if a clash occurs between the protection members 13a to 13c and the optical disk 14, it is possible to reduce the possibility of generating a flaw on the surface of the optical disk 14.

Thirteenth Embodiment

Here, a description will be given as to an embodiment of the optical disk device of the present invention.

Figure 14A:
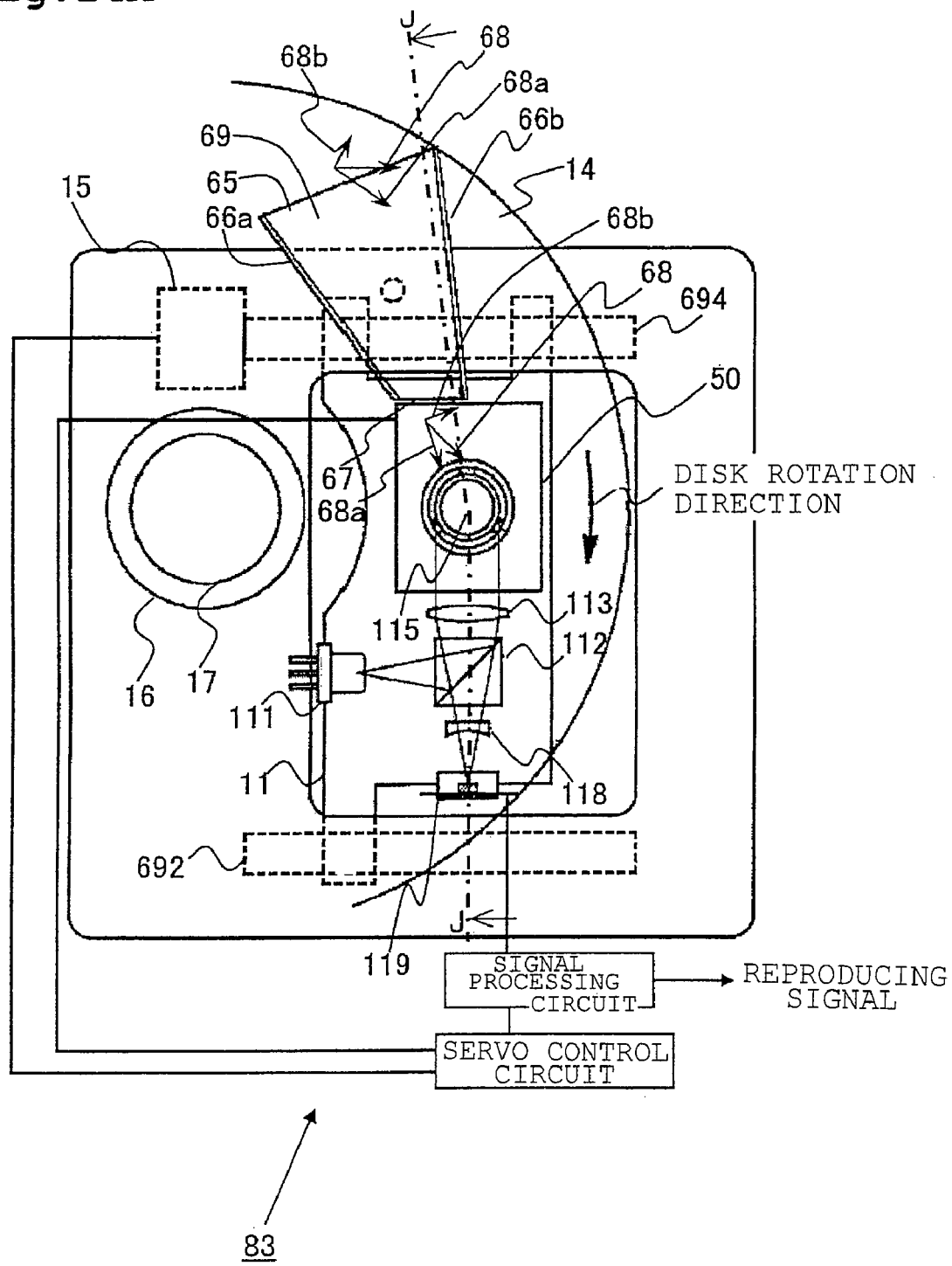
FIG. 14A is a top view of an optical disk device 83 according to a thirteenth embodiment.
Figure 14B:
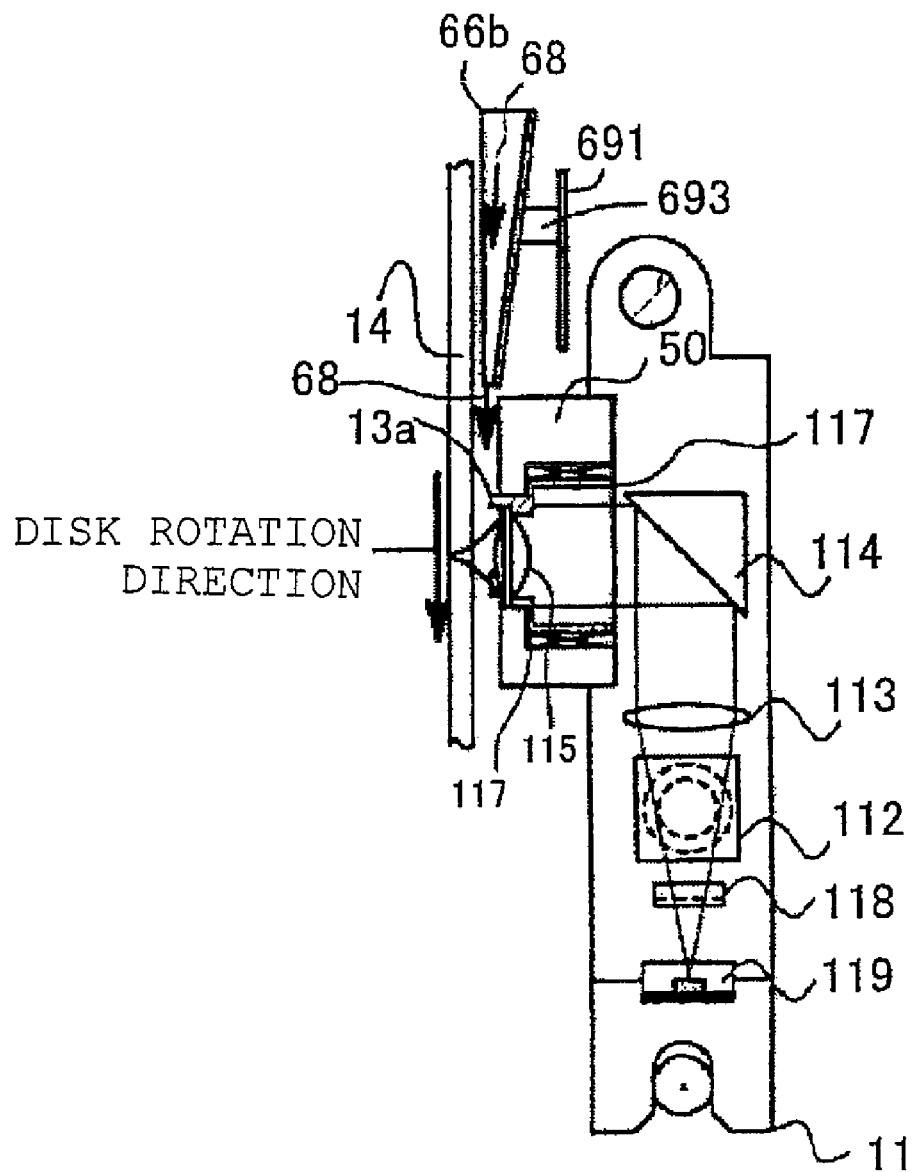
FIG. 14B is a J to J sectional view of the optical disk device 83 according to the thirteenth embodiment.

FIG. 14A is a sectional view of an optical disk device 83 according to a thirteenth embodiment of the present invention. FIG. 14B is a J to J sectional view of the optical disk device 83 shown in FIG. 14A.

The configuration of the optical disk device 83 is a configuration in which the conventional optical disk device 90 is further provided with a airflow guide plate 65. For this reason, a description of the configuration other than the airflow guide plate 65 of the optical disk device 83 will be omitted. Instead, a description will be given by using FIGS. 14A and 14B as to the optical disk device 83 by centering on differences from the conventional optical disk device 90. The basic operation is the same as that of the conventional optical disk device 90.

The following description will be given on the basis that the optical disk 14 is mounted on the optical disk device 83 as with the optical disk device 79 according to the ninth embodiment.

First, the airflow guide plate 65 will be described.

The airflow guide plate 65 is a airflow guide plate for guiding an airflow 68 generated in conjunction with rotation of the optical disk 14 to the objective lens peripheral area as the dust removing wind. FIG. 14A shows the airflow guide plate 65 positioned only in one of the circumferential directions of the optical head 11. It is also possible, however, to place the airflow guide plates 65 in both the circumferential directions of the optical head 11.

The airflow guide plate 65 is fixed on the chassis 691 via a stay 693. The chassis 691 is a chassis for fixing a guide shaft 692 for guiding one end of the optical head 11 and a lead screw 694 for sending the optical head 11 in the radial direction of the optical disk 14.

Next, the structure of the airflow guide plate 65 will be described.

In the case where the surface of the airflow guide plate 65 opposed to the optical disk 14 is a bottom 69, the airflow guide plate 65 has two sidewalls 66a and 66b formed along the circumferential direction of the optical disk 14 from the bottom 69 and extended to the optical disk side from the bottom 69. The sidewall 66a is formed on the inner circumferential side of the bottom 69, and the sidewall 66b is formed on the outer circumferential side of the bottom 69. To be more specific, the airflow guide plate 65 is in a groove-like form with an open portion 67 on the optical head 11 side. As shown in FIG. 14B, the bottom 69 of the airflow guide plate 65 has its open portion 67 side inclined to the optical disk 14 side against a recording surface of the optical disk 14. As shown in FIG. 14A, the bottom 69 of the airflow guide plate 65 has the space between the sidewall 66a and the sidewall 66b becoming narrower as it comes closer to the optical head 11.

Subsequently, a description will be given as to a basic operation whereby the optical disk device 83 generates the dust removing wind.

The airflow 68 generated in conjunction with rotation of the optical disk 14 is taken in by the airflow guide plate 65. The airflow 68 is compressed because the bottom of the airflow guide plate 65 inclines and the space between the sidewall 66a and the sidewall 66b becomes narrower. The compressed airflow 68 is emitted from the open portion 67 as the dust removing wind with its wind speed increased. Thus, the airflow guide plate 65 efficiently guides the airflow 68 to the objective lens peripheral area as the dust removing wind so as to remove the dust attaching to the objective lens peripheral area.

Thus, the optical disk device 83 can remove the dirt, dust and the like attaching to the protection members 13a to 13c, the surface of the optical disk 14 and the like. Therefore, even if a clash occurs between the protection members 13a to 13c and the optical disk 14, it is possible to reduce the possibility of generating a flaw on the surface of the optical disk 14.

In this embodiment, the actuator cover 50 or 55 may be used instead of the actuator cover 18. It is thereby possible to render the effect of removing the dust greater than that in the case of using only the airflow guide plate 65. The optical head 11 may also be reciprocated in the radial direction of the optical disk 14. Thus, the direction of the dust removing wind to the objective lens peripheral area changes so that a turbulent flow can be generated in the objective lens peripheral area. It is thereby possible to render the effect of removing the dust greater.

In this embodiment, it is also possible to detach the actuator cover 18 and use the objective lens holder 60.

Fourteenth Embodiment

Here, a description will be given as to an embodiment of a disk cartridge according to the present invention.

Figure 15A:
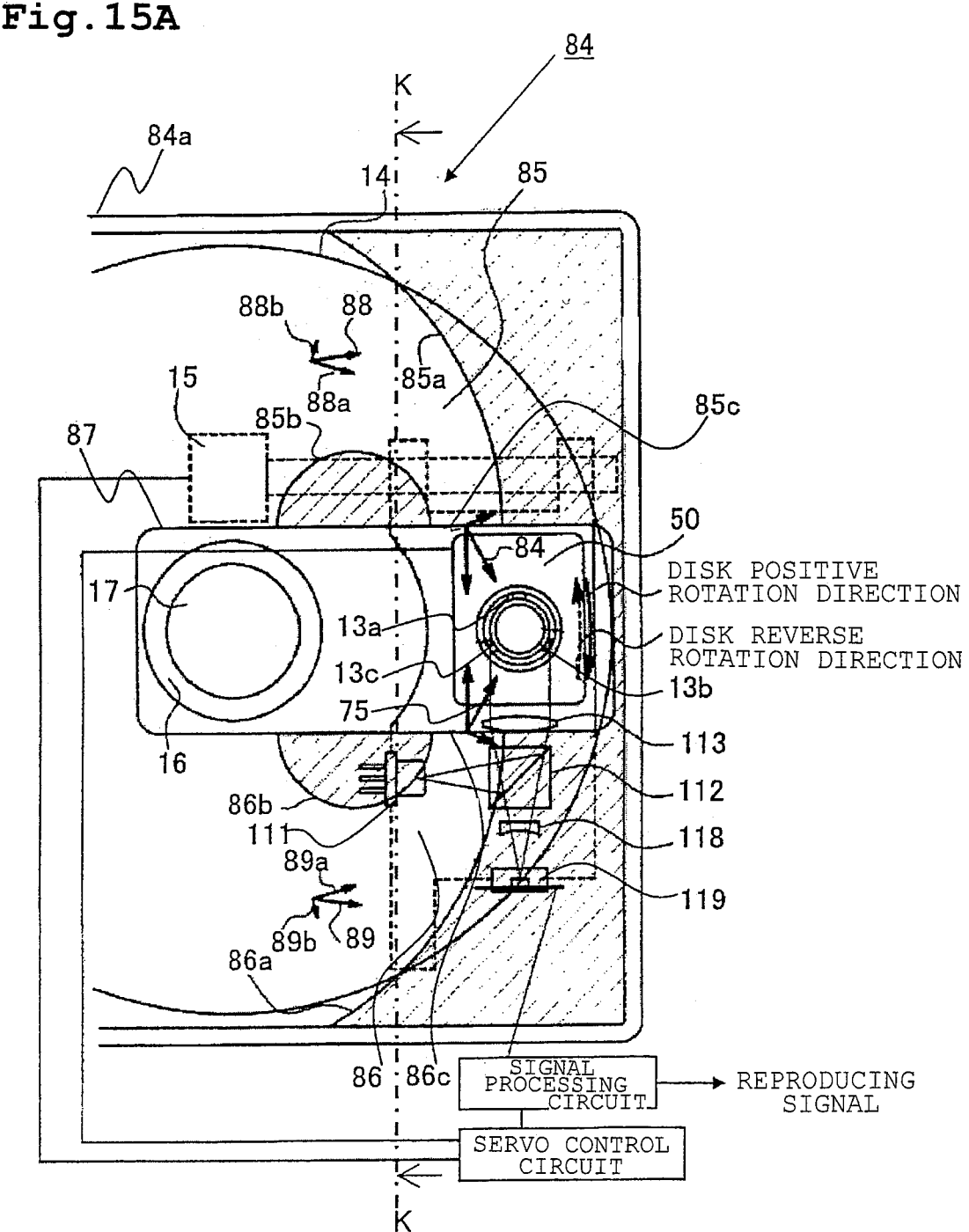
FIG. 15A is a top view of the optical disk device having a disk cartridge 84 according to a fourteenth embodiment mounted thereon.
Figure 15B:
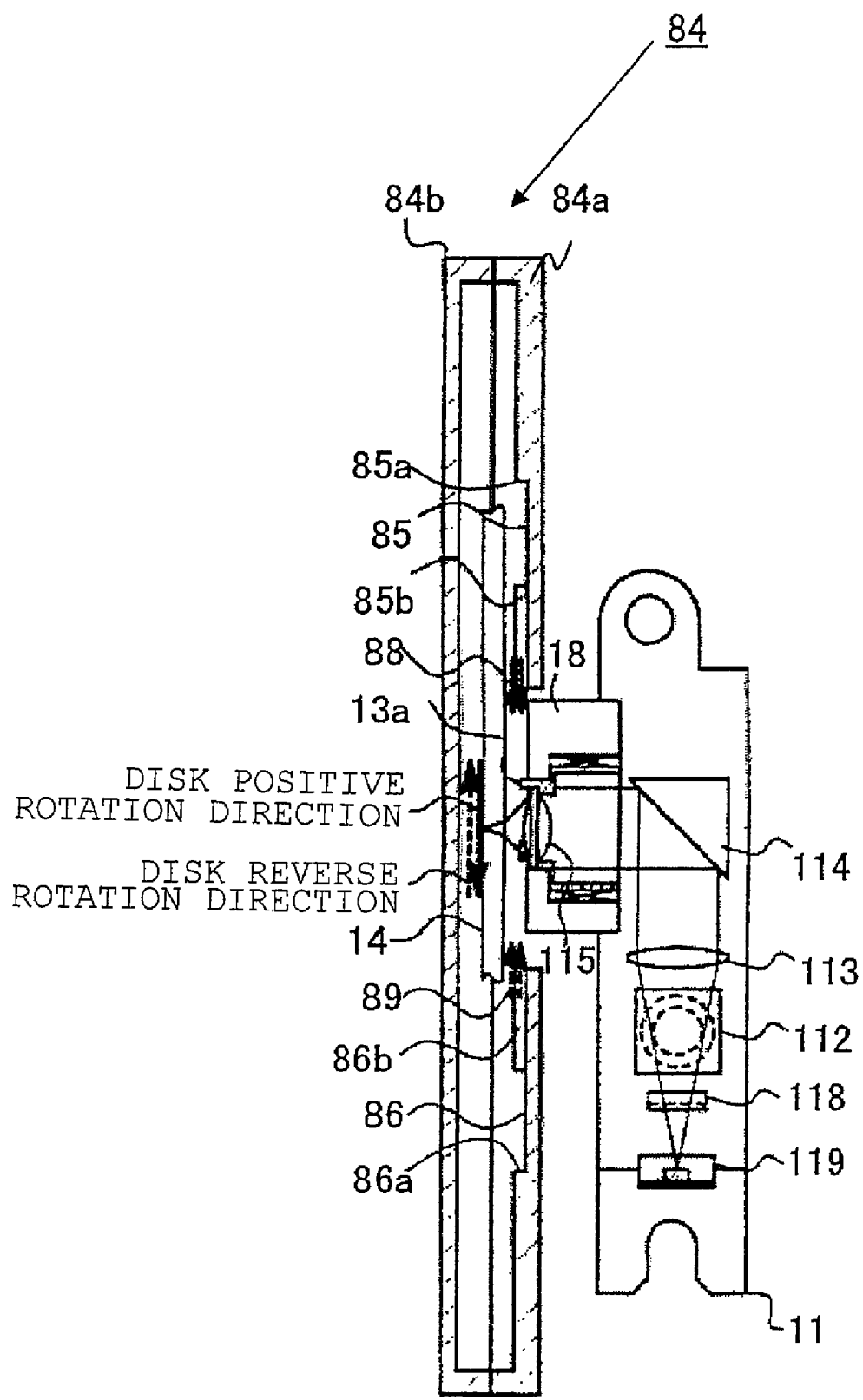
FIG. 15B is a K to K sectional view of the optical disk device having the disk cartridge 84 according to the fourteenth embodiment mounted thereon.

FIG. 15A is a top view of the conventional optical disk device 90 having a disk cartridge 84 of a fourteenth embodiment according to the present invention mounted thereon. FIG. 15B is a K to K sectional view of FIG. 15A. FIG. 15B shows a state in which the optical head 11 is moved onto a K to K line indicated in FIG. 15A.

Hereunder, a description will be given by using FIGS. 15A and 15B as to the disk cartridge 84 of the fourteenth embodiment.

The disk cartridge 84 shown in FIG. 15B includes an upside body 84a and a downside body 84b. The upside body 84a is a housing on the optical head 11 side of the disk cartridge 84. The upside body 84a is provided with an opening 87 for letting the actuator cover 18 and turntable 16 into the upside body 84a. The downside body 84b is a housing of the disk cartridge 84 on the opposite side of the optical head 11. The opening 87 is provided with a sliding shutter (not shown).

Next, the structure of the upside body 84a will be described.

The upside body 84a includes a first groove 85 and a second groove 86 on the surface opposed to the optical disk 14. The first groove 85 and second groove 86 are provided along the circumferential direction of the optical disk 14, and have open portions 85c and 86c on the margin of the opening 87 respectively.

The first groove 85 is formed by a first sidewall 85a and a second sidewall 85b extending along the circumferential direction from the opening 87 of the disk cartridge 84. The first sidewall 85a is provided on the outer circumferential side of the optical disk 14, and the second sidewall 85b is provided on the inner circumferential side. The space between the first sidewall 85a and the second sidewall 85b becomes smaller as it comes closer to the opening 87.

The second groove 86 is provided in a position on the opposite side to the first groove 85 by sandwiching the opening 87. The second groove 86 is formed by a third sidewall 86a and a fourth sidewall 86b extending along the circumferential direction from the opening 87 of the disk cartridge 84. The third sidewall 86a is provided on the outer circumferential side of the optical disk 14, and the fourth sidewall 86b is provided on the inner circumferential side. The space between the third sidewall 86a and the fourth sidewall 86b becomes smaller as it comes closer to the opening 87.

Subsequently, a description will be given as to a principle of the disk cartridge 84 guiding the dust removing wind.

If the optical disk 14 rotates in the positive rotation direction, an airflow 88 having a circumferential airflow 88a and a radial airflow 88b combined is generated. The airflow 88 is taken in by the first groove 85. The airflow 88 is compressed as it comes closer to the opening 87. The compressed airflow 88 is emitted from the open portion 85c as the dust removing wind. The dust removing wind emitted from the open portion 85c removes the dust attaching to the objective lens peripheral area.

If the optical disk 14 rotates in the reverse rotation direction, an airflow 89 having a circumferential airflow 89a and a radial airflow 89b combined is generated. The airflow 89 is taken in by the second groove 86. For this reason, the airflow 89 is compressed as it comes closer to the opening 87. The compressed airflow 89 is emitted from the open portion 86c as the dust removing wind. The dust removing wind emitted from the open portion 86c removes the dust attaching to the objective lens peripheral area.

Thus, the disk cartridge of this embodiment is mounted on the optical disk device so as to be capable of removing the dirt, dust and the like attaching to the protection members 13a to 13c of the optical disk device 90, the surface of the optical disk 14 and the like. For this reason, even if a clash occurs between the protection members 13a to 13c and the optical disk 14, it is possible to reduce the possibility of generating a flaw on the surface of the optical disk 14.

Figure 16:
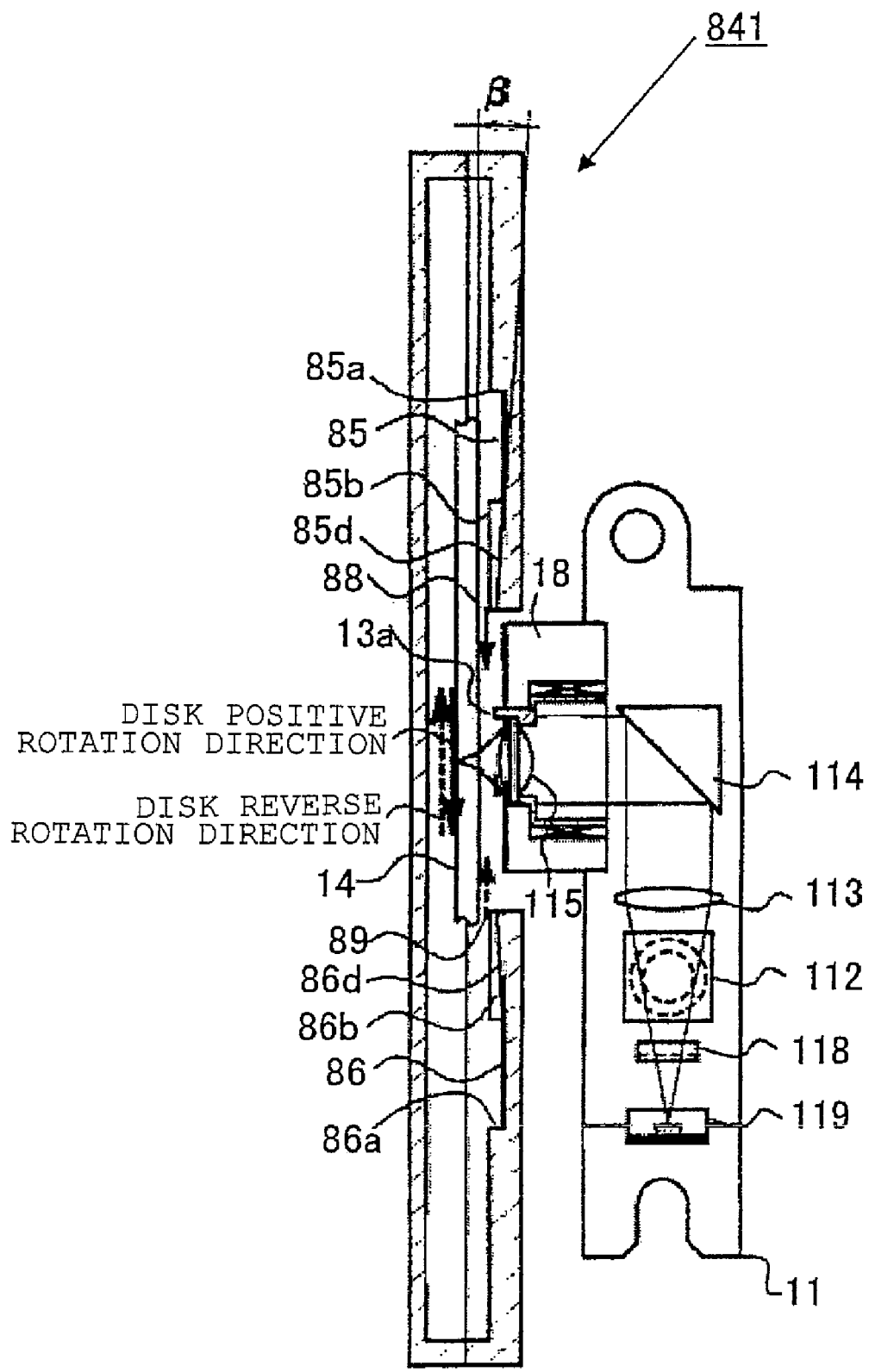
FIG. 16 is a sectional view of the optical disk device having the disk cartridge 84 according to the fourteenth embodiment mounted thereon.

FIG. 16 is a sectional view of a disk cartridge 841 having taper portions provided on the bottom faces of the first groove 85 and the second groove 86. The disk cartridge 841 shown in FIG. 16 is provided with taper portions 85d and 86d where depths of the grooves become smaller as they come closer to the opening 87 on the bottoms of the first groove 85 and the second groove 86 respectively. As the disk cartridge 841 includes the taper portions 85d and 86d, it is possible to further compress the airflows 88 and 89 so that the wind speed of the dust removing wind can be faster than the case of using the disk cartridge 84 shown in FIGS. 15A and 15B.

It was described that the disk cartridge according to this embodiment is mounted on the conventional optical disk device 90. It goes without saying, however, that the disk cartridge according to this embodiment may be mounted on the optical disk devices of the first to thirteenth embodiments.

As for the embodiments for using the turntable having the induction grooves formed thereon, cross-sections of the induction grooves are shown in FIG. 3 (d) which is an L to L sectional view of FIG. 3 (b). However, they are not limited thereto, but may be in any form as long as the dust removing wind can be generated in conjunction with rotation of the turntable. For instance, it is thinkable to render a cross-section shape semicircular, U-shaped or V-shaped.

It was described that the turntable described in the embodiments for using the turntable having the induction grooves formed thereon includes eight induction grooves and fins respectively. However, the numbers of induction grooves and fins are not limited thereto. Also, the turntable may be provided with either the induction grooves or the fins in the embodiments.

INDUSTRIAL APPLICABILITY

The optical disk device and the control method of the optical disk device according to the present invention have the effect of reducing the possibility of generating a flaw on the data recording surface of the optical disk, which are useful as the optical disk device and the control method of the optical disk device.

The invention claimed is:

1. An optical disk device comprising:
an optical head including an objective lens for recording data on an optical disk and/or reproducing the data recorded on the optical disk;
a turntable for mounting the optical disk;
a driving motor for rotating the turntable; and
protection member provided on the optical head to prevent a clash between the objective lens and the optical disk,
wherein a first airflow guide portion is provided on the optical head for guiding an airflow generated by rotation of the optical disk to the protection member.

2. The optical disk device according to claim 1, wherein:
the protection member is provided around the objective lens; and
the first airflow guide portion is two grooves which are formed on a surface of an actuator cover opposed to the optical disk so as to be oriented toward one side and the other side from the objective lens in a circumferential direction of the optical disk and each of the two grooves has an open portion on a side of the actuator cover.

3. The optical disk device according to claim 1, wherein:
the protection member is provided around the objective lens; and
the first airflow guide portion is two grooves which are formed on a surface of an objective lens holder opposed to the optical disk so as to be oriented toward one side and the other side from the objective lens in a circumferential direction of the optical disk and each of the grooves has an open portion on a side of the objective lens holder.

4. The optical disk device according to claim 2, wherein convex portions for changing the airflow are provided on bottom faces of the two grooves.

5. The optical disk device according to claim 2, wherein widths of the two grooves become narrower as the two grooves come closer to the objective lens.

6. The optical disk device according to claim 2, wherein depths of the two grooves become smaller as the two grooves come closer to the objective lens.

7. The optical disk device according to claim 1, further comprising a second airflow guide portion for sending wind to the optical head.

8. The optical disk device according to claim 7, wherein:
the second airflow guide portion is a airflow guide plate including (i) a bottom on a surface opposed to the optical disk and (ii) a sidewall formed along a circumferential direction of the optical disk from the bottom and extended to the optical disk side, and placed on a circumferential direction side of the actuator cover or the objective lens holder.

9. The optical disk device according to claim 8, wherein a width between an inner circumferential side and an outer circumferential side of the airflow guide plate becomes smaller as the airflow guide plate comes closer to the optical head.

10. The optical disk device according to claim 8, wherein the airflow guide plate is inclined toward the optical disk at an angle at which a distance between the airflow guide plate and the optical disk becomes smaller as the airflow guide plate comes closer to the optical head side.

11. A disk cartridge for housing an optical disk onto which information is recorded by an optical disk device having a turntable and an optical head having an actuator cover, the disk cartridge comprising:
a downside body; and
an upside body including:
(i) an opening for letting the actuator cover of the optical head and the turntable into the upside body; and
(ii) two grooves, on a surface of the upside body opposed to the optical disk toward a circumferential direction from a margin of the opening, for guiding an airflow generated by rotation of the optical disk.

12. The disk cartridge according to claim 11, wherein widths of the two grooves become gradually narrower as the two grooves come closer to the margin of the opening.

13. The disk cartridge according to claim 11, wherein a taper portion is provided for rendering depths of the two grooves gradually shallower as the two grooves come closer to the margin of the opening.

14. The optical disk device according to claim 7, wherein the second airflow guide portion comprises a first concave portion and/or a first convex portion provided on a surface of the rotor of the driving motor for the sake of generating an airflow to the protection member.

15. The optical disk device according to claim 14, wherein:
the driving motor is an outer rotor type motor; and
the concave portions are plural grooves provided on an outer circumferential surface of the rotor of the driving motor at a predetermined angle to the turntable.

16. The optical disk device according to claim 14, wherein:
the driving motor is an outer rotor type motor; and
the convex portions are plate-like projections provided on the outer circumferential surface of the rotor of the driving motor.

17. The optical disk device according to claim 14, wherein the second airflow guide portion comprises a second concave portion and/or a second convex portion provided on a surface of the turntable for generating an airflow to the protection member, other than the first concave portion and/or the first convex portion.

18. The optical disk device according to claim 17, wherein the second concave portions are plural grooves which are formed radially or as if drawing an arc from vicinity of a center of the turntable and include open portions on outer peripheries of the turntable.

19. The optical disk device according to claim 17, wherein the plural grooves are provided on an opposite side of a surface on which the turntable contacts the optical disk.

20. The optical disk device according to claim 17, wherein:
the plural grooves are provided on a surface on which the turntable contacts the optical disk; and
the turntable is provided with plural holes penetrating a bottom face of the vicinity of the center side of the plural grooves and an opposite-side surface of the surface of the turntable contacting the optical disk.

21. The optical disk device according to claim 17, wherein the second convex portions are plate-like projections provided on the outer peripheries of the turntable.

22. The optical disk device according to claim 14, wherein:
the second airflow guide portion further comprises an induction plate for inducing the airflow which surrounds an outer circumference of at least one of the turntable and the rotor of the driving motor and includes an opening in a direction of the protection member.

23. The optical disk device according to claim 1, further comprising:
a stopper for preventing a predetermined limit value from being exceeded in movement of the optical head to a center side in the radial direction of the optical disk.

24. A method of controlling an optical disk device having a driving motor for rotating a turntable for mounting an optical disk comprising the steps of controlling generation of an airflow by rotation of the optical disk and guiding the airflow to protection member provided on an optical head of the optical disk device to prevent a clash between an objective lens and the optical disk:
driving the driving motor for a predetermined period in a first predetermined timing when the optical disk is mounted on the turntable; and
driving the driving motor for a predetermined period in a second predetermined timing different from the first predetermined timing when the optical disk is not mounted on the turntable.

25. The method of controlling an optical disk device according to claim 24, further comprising the steps of:
detecting timing of when the optical disk is mounted on the turntable; and
driving the driving motor before the optical disk is mounted on the turntable based on a result of the detection.

26. The method of controlling an optical disk device according to claim 25, further comprising the step of:
in the case where the driving motor is driven in a reverse direction before the optical disk is mounted on the turntable in the step of driving the driving motor, subsequently continuing to drive the driving motor in a positive direction.

27. The method of controlling an optical disk device according to claim 24, further comprising the step of:
when driving the driving motor for a predetermined period in the predetermined timing, moving the optical head in an innermost circumferential position in a radial direction of the optical disk.

28. The method of controlling an optical disk device according to claim 24, further comprising:
a step of switching a rotation direction of the driving motor for changing a direction of the airflow and/or a step of changing rotation speed of the driving motor for changing intensity of the airflow.

29. The optical disk device according to claim 3, wherein convex portions for changing the airflow are provided on bottom faces of the two grooves.

30. The optical disk device according to claim 3, wherein widths of the two grooves become narrower as the two grooves come closer to the objective lens.

31. The optical disk device according to claim 3, wherein depths of the two grooves become smaller as the two grooves come closer to the objective lens.

32. The optical disk device according to claim 17, wherein:
the second airflow guide portion further comprises an induction plate for inducing the airflow which surrounds an outer circumference of at least one of the turntable and the rotor of the driving motor and includes an opening in a direction of the protection member.

* * * * *